United States Patent
Meier et al.

(10) Patent No.: US 7,018,117 B2
(45) Date of Patent: Mar. 28, 2006

(54) IDENTIFICATION CARD PRINTER RIBBON CARTRIDGE

(75) Inventors: James M. Meier, St. Paul, MN (US); Chadwick M. Johnson, Savage, MN (US); Gary P. Countryman, Jr., Columbia Heights, MN (US); Stacy W. Lukaskawcez, Shakopee, MN (US); Gary M. Klinefelter, Eden Prairie, MN (US); Ryan G. Park, Farmington, MN (US); Matthew K. Dunham, Eagan, MN (US); Jeffrey D. Upin, Edina, MN (US); Gary A. Lenz, Eden Prairie, MN (US); Leon Gershenovich, Eden Prairie, MN (US); Thomas C. Platner, Eden Prairie, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 204 days.

(21) Appl. No.: 10/647,798

(22) Filed: Aug. 25, 2003

(65) Prior Publication Data

US 2004/0114981 A1 Jun. 17, 2004

Related U.S. Application Data

(63) Continuation-in-part of application No. 10/071,554, filed on Feb. 8, 2002, now Pat. No. 6,694,884, which is a continuation-in-part of application No. 09/489,591, filed on Jan. 21, 2000, now Pat. No. 6,386,772.

(60) Provisional application No. 60/497,009, filed on Aug. 19, 2003, provisional application No. 60/459,712, filed on Apr. 2, 2003, and provisional application No. 60/117,123, filed on Jan. 25, 1999.

(51) Int. Cl.
*B41J 35/28* (2006.01)

(52) U.S. Cl. .................... 400/208; 347/214; 705/22; 705/28

(58) Field of Classification Search ............... 400/208, 400/207, 188, 234; 705/50, 56, 57, 22, 28, 705/29; 347/214; 358/296
See application file for complete search history.

(56) References Cited

U.S. PATENT DOCUMENTS

| 3,598,396 A | 8/1971 | Andrews et al. .............. 271/9 |
| 3,755,653 A | 8/1973 | Venker .................... 235/61.11 |
| 3,889,472 A | 6/1975 | Guillaud ...................... 60/698 |

(Continued)

FOREIGN PATENT DOCUMENTS

| DE | 25 35 699 A1 | 3/1977 |
| EP | 0 562 979 | 9/1993 |
| EP | 0 887 197 | 12/1998 |

(Continued)

OTHER PUBLICATIONS

"Standard Read/Write Identification IC", by TEMIC Semiconductor GmbH, Heilbronn, Germany, (Apr. 1999).
"Introducing the New SmartGuard™ and SmartShield™ Advanced Security Options", pamphlet by Fargo Electronics, Inc., Eden Prairie, Minnesota (1998).

(Continued)

*Primary Examiner*—Eugene H. Eickholt
(74) *Attorney, Agent, or Firm*—Westman, Champlin & Kelly

(57) ABSTRACT

A ribbon cartridge includes a cartridge housing, a supply spool, a take-up spool, and a supply of ribbon. The cartridge housing includes a supply spool enclosure, a take-up spool enclosure, a pair of ribbon guides, and a gap between the ribbon guides and the supply and take-up spool enclosures. The supply spool is contained in the supply spool enclosure, and the take-up spool is contained in the take-up spool enclosure. The ribbon extends from the supply spool, over the ribbon guides and the gap, and to the take-up spool. Another aspect of the ribbon cartridge includes a cartridge housing and a cleaner roller. The cartridge housing includes front and rear walls. The cleaner roller is rotatably supported between the front and rear walls.

72 Claims, 15 Drawing Sheets

U.S. PATENT DOCUMENTS

| | | | | |
|---|---|---|---|---|
| 3,889,795 A | * | 6/1975 | Garberi et al. | 400/208 |
| 3,899,065 A | * | 8/1975 | Brignole | 400/208 |
| 3,960,072 A | | 6/1976 | Ahlgren et al. | 101/35 |
| 4,015,839 A | | 4/1977 | McKee | 271/37 |
| 4,017,068 A | | 4/1977 | McKee | 271/275 |
| 4,031,518 A | | 6/1977 | Holloran et al. | 340/172.5 |
| 4,068,028 A | | 1/1978 | Samonides | 428/40 |
| 4,102,267 A | | 7/1978 | Ritzerfeld | 101/132.5 |
| 4,146,900 A | | 3/1979 | Arnold | 346/75 |
| 4,161,312 A | | 7/1979 | Eckhardt et al. | 271/3 |
| 4,350,453 A | * | 9/1982 | Field et al. | 400/208 |
| 4,350,454 A | * | 9/1982 | Schoenlein | 400/234 |
| 4,393,386 A | | 7/1983 | Di Giulio | 346/75 |
| 4,471,885 A | | 9/1984 | Mucciarone | 221/155 |
| 4,534,313 A | | 8/1985 | Louvel | 118/696 |
| 4,604,631 A | | 8/1986 | Jinnai et al. | 346/1.1 |
| 4,673,304 A | * | 6/1987 | Liu et al. | 400/208 |
| 4,676,678 A | * | 6/1987 | Watanabe | 400/208 |
| 4,680,596 A | | 7/1987 | Logan | 346/140 |
| 4,685,702 A | | 8/1987 | Kazuharu | 283/81 |
| 4,686,540 A | | 8/1987 | Leslie et al. | 346/33 |
| 4,687,358 A | * | 8/1987 | Saitou | 400/208 |
| 4,716,346 A | | 12/1987 | Matsuo | 318/38 |
| 4,733,980 A | * | 3/1988 | Tosa | 400/207 |
| 4,734,868 A | | 3/1988 | DeLacy | 364/519 |
| 4,781,985 A | | 11/1988 | Desjarlais | 428/421 |
| 4,782,363 A | | 11/1988 | Britt et al. | 355/14 |
| 4,797,018 A | | 1/1989 | Hofmann et al. | 400/208 |
| 4,845,490 A | | 7/1989 | Ward et al. | 340/825.31 |
| 4,848,941 A | * | 7/1989 | Imaseki | 406/120 |
| 4,961,088 A | | 10/1990 | Gilliland et al. | 355/206 |
| 5,019,839 A | | 5/1991 | Watanabe et al. | 346/134 |
| 5,077,467 A | | 12/1991 | Barron, Jr. et al. | 250/221 |
| 5,111,239 A | | 5/1992 | Kamimura et al. | 355/45 |
| 5,128,763 A | * | 7/1992 | Sakuragi | 358/296 |
| 5,138,344 A | | 8/1992 | Ujita | 400/175 |
| 5,149,211 A | | 9/1992 | Pettigrew | 400/88 |
| 5,184,261 A | | 2/1993 | Kurando et al. | 355/260 |
| 5,239,926 A | | 8/1993 | Nubson et al. | 101/487 |
| 5,266,968 A | | 11/1993 | Stephenson | 400/208 |
| 5,267,800 A | | 12/1993 | Petterutl et al. | 400/88 |
| 5,277,501 A | | 1/1994 | Tanaka et al. | 400/120 |
| 5,318,369 A | | 6/1994 | Ishii | 400/249 |
| 5,318,370 A | | 6/1994 | Nehowig | 400/207 |
| 5,326,179 A | | 7/1994 | Fukai et al. | 400/120 |
| 5,327,201 A | | 7/1994 | Coleman et al. | 355/278 |
| 5,368,677 A | | 11/1994 | Ueda et al. | 156/362 |
| 5,455,617 A | | 10/1995 | Stephenson et al. | 400/207 |
| 5,466,319 A | | 11/1995 | Zager et al. | 156/220 |
| 5,502,464 A | | 3/1996 | Takahashi et al. | 346/25 |
| 5,516,218 A | | 5/1996 | Amano et al. | 400/535 |
| 5,530,468 A | | 6/1996 | Yoshimi et al. | 347/262 |
| 5,558,449 A | * | 9/1996 | Morgavi | 400/188 |
| 5,642,877 A | | 7/1997 | Green | 271/35 |
| 5,646,388 A | | 7/1997 | D'Entremont et al. | 235/380 |
| 5,695,589 A | | 12/1997 | German et al. | 156/250 |
| 5,703,347 A | | 12/1997 | Reddersen et al. | 235/472 |
| 5,707,162 A | | 1/1998 | Kasal et al. | 400/692 |
| 5,709,484 A | | 1/1998 | Dorner | 400/188 |
| 5,709,485 A | | 1/1998 | Kohno | 400/208 |
| 5,755,519 A | | 5/1998 | Klinefelter | 400/249 |
| 5,772,199 A | | 6/1998 | Green | 271/10.06 |
| 5,790,162 A | | 8/1998 | Adams et al. | 347/222 |
| 5,820,281 A | | 10/1998 | Hill et al. | 400/621 |
| 5,837,991 A | | 11/1998 | LaManna et al. | 235/475 |
| 5,882,127 A | | 3/1999 | Amano | 400/521 |
| 5,936,008 A | | 8/1999 | Jones et al. | 523/161 |
| 5,978,621 A | | 11/1999 | Glemser et al. | 399/90 |
| 5,980,011 A | | 11/1999 | Cummins et al. | 347/4 |
| 5,984,546 A | * | 11/1999 | Kameyama | 400/208 |
| 5,995,774 A | | 11/1999 | Applegate et al. | 399/27 |
| 6,011,741 A | | 1/2000 | Wallace et al. | 365/221 |
| 6,037,879 A | | 3/2000 | Tuttle | 340/825.54 |
| 6,039,430 A | | 3/2000 | Helterline et al. | 347/19 |
| 6,071,024 A | | 6/2000 | Chi-Ming et al. | 347/177 |
| 6,072,402 A | | 6/2000 | Kniffin et al. | 340/825 |
| 6,076,913 A | | 6/2000 | Garcia et al. | 347/19 |
| 6,099,101 A | | 8/2000 | Maurelli et al. | 347/7 |
| 6,099,178 A | | 8/2000 | Spurr et al. | 400/207 |
| 6,113,208 A | | 9/2000 | Benjamin et al. | 347/7 |
| 6,163,658 A | | 12/2000 | Suzuki | 399/12 |
| 6,179,401 B1 | | 1/2001 | Stephens, Jr. et al. | 347/19 |
| 6,213,392 B1 | | 4/2001 | Zuppicich | 235/380 |
| 6,252,791 B1 | | 6/2001 | Wallace et al. | 365/221 |
| 6,253,329 B1 | | 6/2001 | Kang | 713/300 |
| 6,263,170 B1 | | 7/2001 | Bortnem | 399/13 |
| 6,264,296 B1 | | 7/2001 | Klinefelter et al. | 347/4 |
| 6,264,301 B1 | | 7/2001 | Helterline et al. | 347/19 |
| 6,267,463 B1 | | 7/2001 | Paulsen | 347/19 |
| 6,271,928 B1 | | 8/2001 | Bullock et al. | 358/1.16 |
| 6,302,527 B1 | | 10/2001 | Walker | 347/50 |
| 6,305,795 B1 | | 10/2001 | Childers et al. | 347/86 |
| 6,312,083 B1 | | 11/2001 | Moore | 347/19 |
| 6,312,106 B1 | | 11/2001 | Walker | 347/50 |
| 6,325,495 B1 | | 12/2001 | Foth | 347/84 |
| 6,341,839 B1 | | 1/2002 | Burikov et al. | 347/37 |
| 6,371,586 B1 | | 4/2002 | Saruta | 347/7 |
| 6,380,965 B1 | | 4/2002 | Sims et al. | 347/218 |
| 6,405,055 B1 | | 6/2002 | Silverbrook et al. | 455/556 |
| 6,412,991 B1 | | 7/2002 | Klinefelter et al. | 400/240 |
| 6,464,317 B1 | | 10/2002 | Miyazawa | 347/14 |
| 6,631,967 B1 | | 10/2003 | Saruta | 347/19 |
| 6,644,771 B1 | | 11/2003 | Silverbrook | 347/19 |
| 6,650,351 B1 | | 11/2003 | Yamamoto et al. | 347/214 |
| 6,762,780 B1 | | 7/2004 | Tsuruta et al. | 347/171 |
| 6,798,434 B1 | * | 9/2004 | Shibata et al. | 347/214 |
| 6,816,968 B1 | | 11/2004 | Walmsley | 713/168 |
| 2002/0118243 A1 | | 8/2002 | Forman | 347/19 |
| 2002/0180993 A1 | | 12/2002 | Klinefelter et al. | 358/1.1 |
| 2003/0028766 A1 | | 2/2003 | Gass et al. | 713/164 |
| 2004/0022572 A1 | | 2/2004 | Bungert et al. | 400/248 |

FOREIGN PATENT DOCUMENTS

| | | | |
|---|---|---|---|
| EP | 0 979 736 | | 2/2000 |
| EP | 1 095 783 B1 | | 12/2003 |
| GB | 2 120 821 A | | 12/1983 |
| JP | 411105359 A | | 4/1999 |
| JP | 11 265463 | | 9/1999 |
| JP | 02002120446 A | * | 4/2002 |
| WO | WO 95/09084 | | 4/1995 |
| WO | WO 99/04368 | | 1/1999 |
| WO | WO 99/21713 | | 5/1999 |
| WO | 99/49379 | | 9/1999 |
| WO | WO 03/060811 | | 12/2002 |
| WO | WO 2004/011268 A1 | | 2/2004 |

OTHER PUBLICATIONS

"RFID Tagging IC is First to Accept Input from Sensors", by Microchip Technology Inc., (undated).

Two page web site advertisement from SEIKO Precision, entitled "The lastest design for your CD–R", re: CD Printer 2000.

Two page web site advertisement from SEIKO Precision, entitled "CD Printer 2000".

Two page web site advertisement from SEIKO Precision, entitled "CD Printer 4000".

Partial International Search for International Application No. PCT/US 01/17146, filed May 25, 2001 (with Invitation to Pay Fees).

International Search Report for International Application No. PCT/US 00/01697, filing date Jan. 21, 2000, dated Oct. 18, 2000.

Streamfeeder—ST 1250 Universal Friction Feeder; last modified Feb. 27, 2000; 1 page with heading of "Streamfeeder—Product Index"; and 3 pages with heading of "Streamfeeder—ST 1250 Universal Friction Feeder".

Office Communication for Application No. 10/647,666, filed Aug. 25, 2003, date of mailing: Sep. 15, 2004.

* cited by examiner

FIG. 3

IDENTIFICATION CARD PRINTER RIBBON CARTRIDGE

The present application is a Continuation-in-Part of U.S. patent application Ser. No. 10/071,554, filed Feb. 8, 2002, now U.S. Pat. No. 6,694,884, entitled "METHOD AND APPARATUS FOR COMMUNICATING BETWEEN PRINTER AND CARD SUPPLY," which is a Continuation-in-Part of U.S. application Ser. No. 09/489,591, filed Jan. 21, 2000, entitled "METHOD AND APPARATUS FOR COMMUNICATING BETWEEN PRINTER OR LAMINATOR AND SUPPLIES" and issued as U.S. Pat. No. 6,386,772 on May 14, 2002, which in turn claims the benefit U.S. Provisional Application Ser. No. 60/117,123, filed Jan. 25, 1999; the present application also claims the benefit of Provisional Patent Application Ser. No. 60/459,712, filed Apr. 2, 2003; and the present application claims the benefit of U.S. Provisional Patent Application Ser. No. 60/497,009, filed Aug. 19, 2003, entitled "IDENTIFICATION CARD PRINTER AND RIBBON CARTRIDGE" for inventors James M. Meier, Chadwick M. Johnson, Gary Countryman, Stacy W. Lukaskawcez and Ryan Parks.

FIELD OF THE INVENTION

The present invention generally relates to identification card printers, and more particularly, to a ribbon cartridge for use in identification card printers.

BACKGROUND OF THE INVENTION

Identification cards are widely used to carry information typically relating to the card holder. Identification card printing systems are used to form identification cards by printing an image, which can contain textual and graphical information, on a card substrate, such as a plastic card.

Many identification card printing systems, such as those produced by Fargo Electronics, Inc. of Eden Prairie, Minn., are thermal based printing systems. Such systems print images on card substrates using a thermal printhead and a thermal print ribbon that is held taut between the printhead and the card substrate. The thermal print ribbon or dye sublimation ribbon is typically divided up into different color frames or panels along its length. The frames or panels repeat in a sequence or group consisting of a yellow panel, followed by a magenta panel, which is followed by a cyan panel. In addition, a black resin frame or panel can be provided in the sequence of the color panels, if desired. The thermal printhead includes a plurality of resistive heating elements that are selectively energized to individually heat the panels of the thermal print ribbon and cause print material from the selected panels to transfer to the card substrate and form the desired image.

The thermal print ribbon can be supported in a ribbon cartridge to simplify the loading of the ribbon in the printer. The ribbon cartridge generally incudes a supply spool on which a first end of the ribbon is wound and a take-up spool on which a second end of the ribbon is wound. A middle portion of the ribbon extends between the supply and take-up spools. The printer controls the feeding of the ribbon over the printhead from the supply spool to the take-up spool.

There is a never-ending demand for improvements to ribbon cartridges for use in identification card printers, including forming the ribbon cartridge such that it allows the card printer to be formed more compactly, providing roller cleaning features, and other desirable features.

SUMMARY OF THE INVENTION

The present invention is generally directed to a ribbon cartridge for use in an identification card printer. Aspects of the present invention allow the printer that utilizes the ribbon cartridge of the present invention to be formed more compactly and provide roller cleaning features. The ribbon cartridge generally includes a cartridge housing, a supply spool, a take-up spool, and a supply of ribbon. The cartridge housing includes a supply spool enclosure, a take-up spool enclosure, a pair of ribbon guides, and a gap between the ribbon guides and the supply and take-up spool enclosures. The supply spool is contained in the supply spool enclosure, and the take-up spool is contained in the take-up spool enclosure. The ribbon extends from the supply spool, over the ribbon guides and the gap, and to the take-up spool.

Another aspect of the ribbon cartridge of the present invention includes a cartridge housing and a cleaner roller. The cartridge housing includes front and rear walls. The cleaner roller is rotatably supported between the front and rear walls.

These and other features will become apparent with a careful review of the drawings and the corresponding detailed description.

BRIEF DESCRIPTION OF THE DRAWINGS

FIG. 3 is a schematic diagram of an identification card printer in accordance with various embodiments of the invention with selected components illustrated in cross-section.

DETAILED DESCRIPTION OF THE PREFERRED EMBODIMENTS

Figure 1:
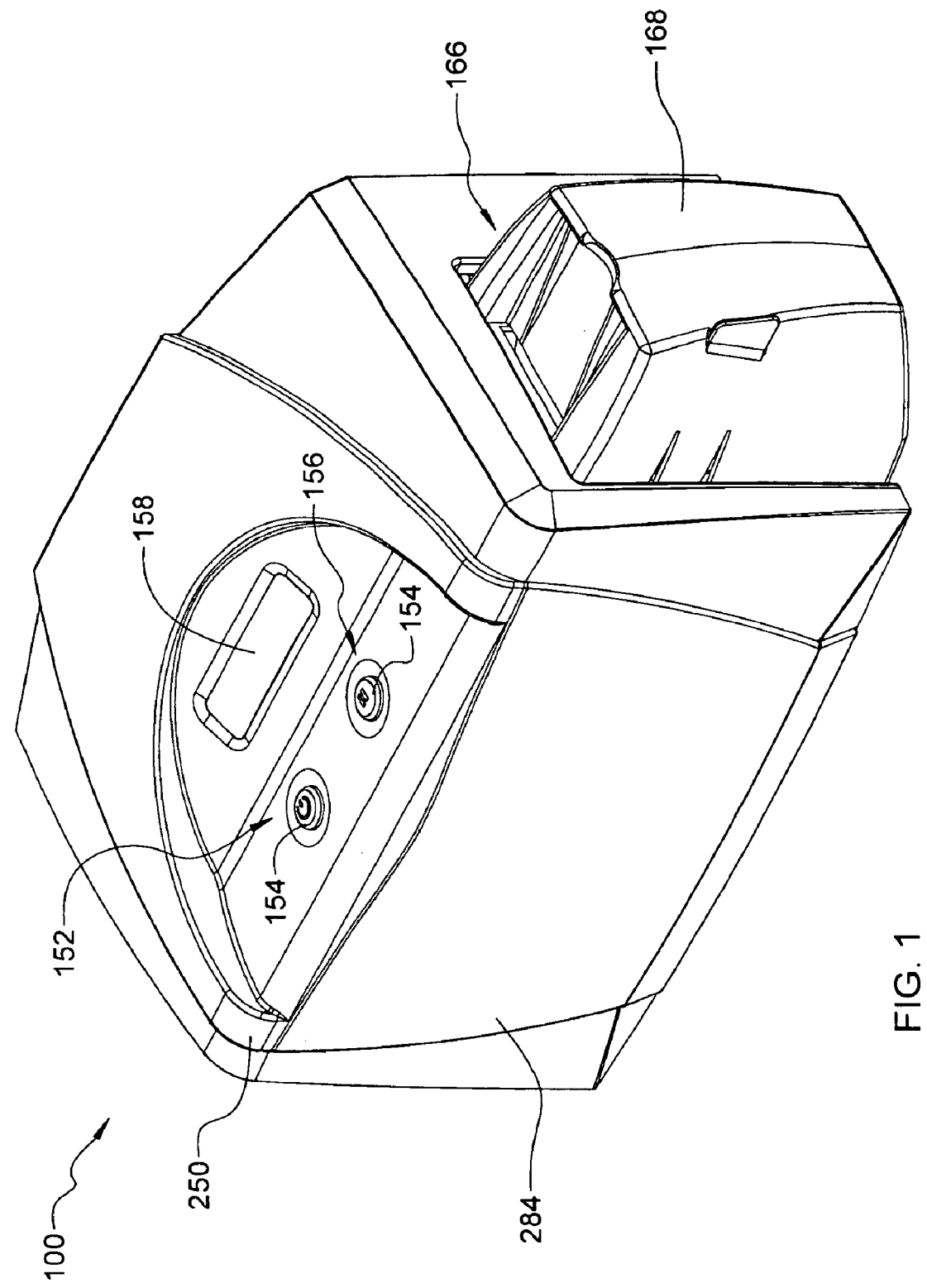
FIG. 1 is a perspective view of an identification card printer in accordance with various embodiments of the invention.
Figure 21:
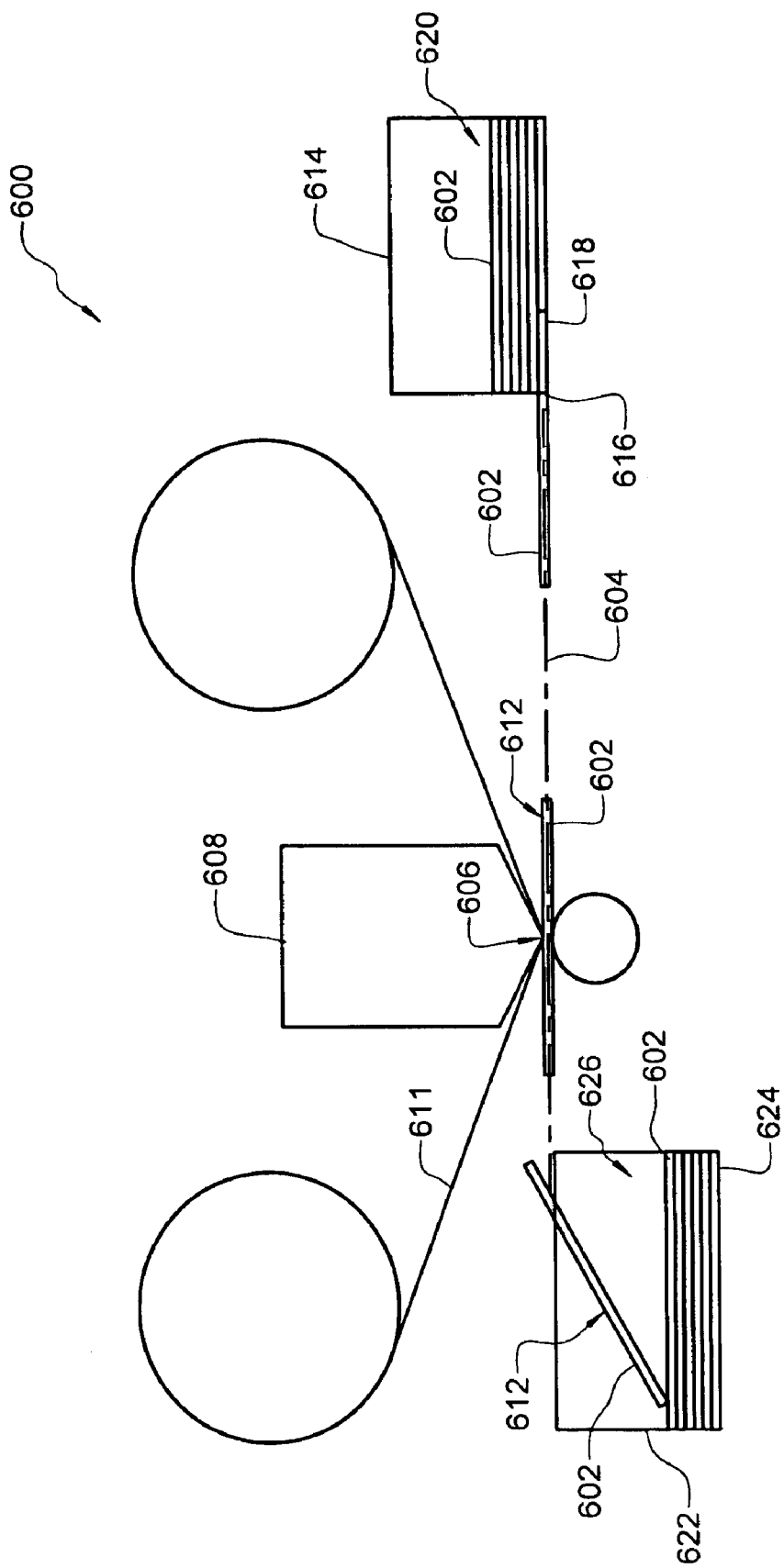
FIG. 21 is schematic diagram of an identification card printer in accordance with the prior art.

An identification card printer 100, with which the ribbon cartridge of the present invention can be used, is shown in FIG. 1. As will be discussed in greater detail below, the ribbon cartridge can operate with an inverted printhead of printer 100 whose resistive heating elements or print elements face upward. This configuration allows printer 100 to be formed more compactly than conventional identification card printers that utilize printheads that are vertically oriented with the print elements facing downward, as illustrated in FIG. 21. In such a conventional card printer 600, cards 602 are fed along a print path 604 below the print elements 606 of the printhead 608. Thermal print 611 ribbon is fed between the print elements 606 and a top surface 612 of card 602, on which an image is to be printed by the printhead 608. A card supply 614 can be provided at a card input 616 where a bottom card 618 from a stack of cards 620 is fed along print path 604. A card hopper 622 can be positioned opposite the card input 616 to collect processed cards 602. Due to the relatively flat print path 604, a base 624 of card hopper 622 must be positioned well below print path 604 in order to collect stack of cards 620. Due to the orientation of printhead 608 above print path 604 and the location of card hopper 622 below print path 604, such conventional identification card printers 600 must be formed relatively tall compared to printer 100 of the present invention.

Figure 2:
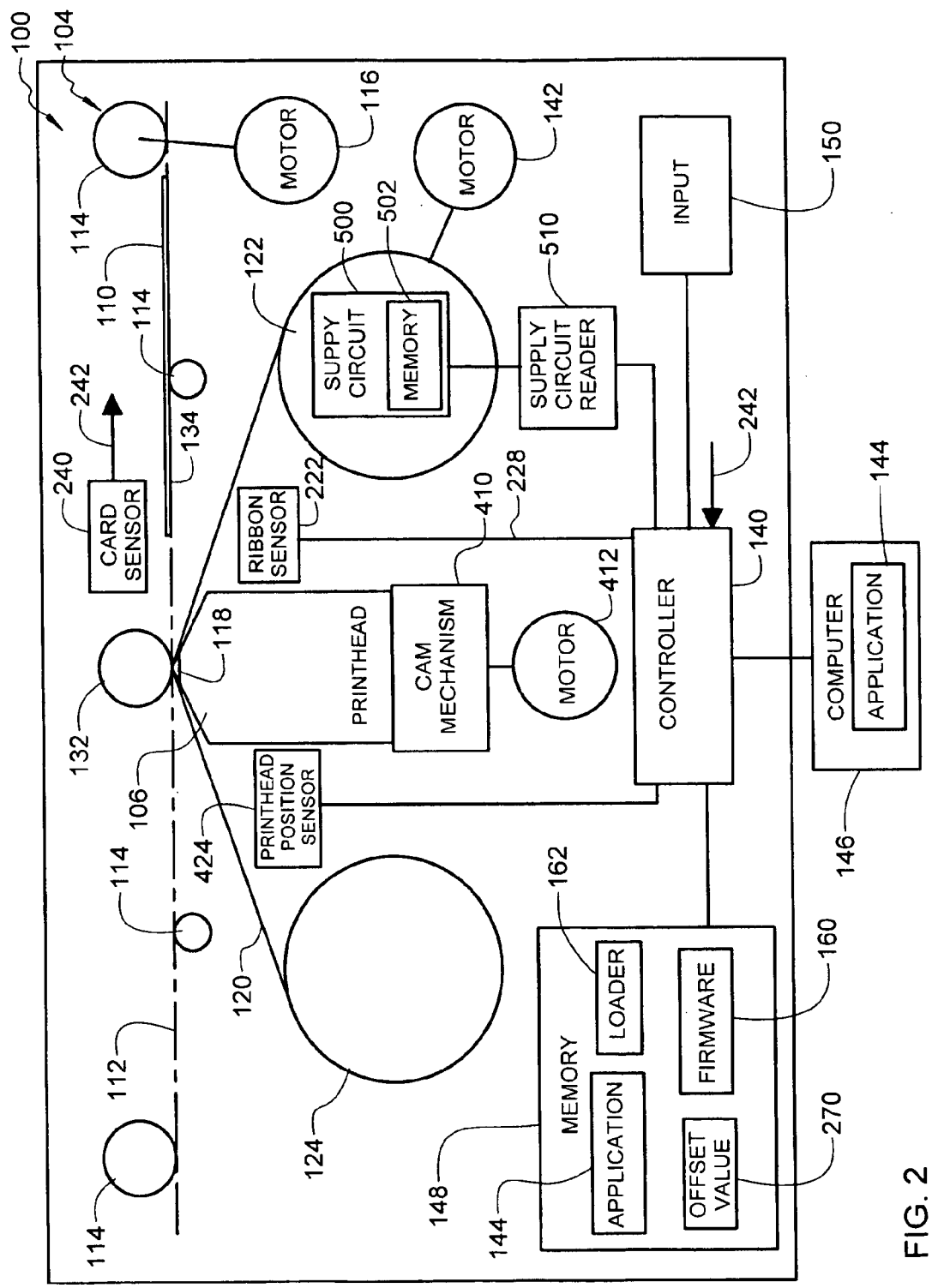
FIG. 2 is a schematic diagram of a printer in accordance with various embodiments of the invention.
Figure 3:
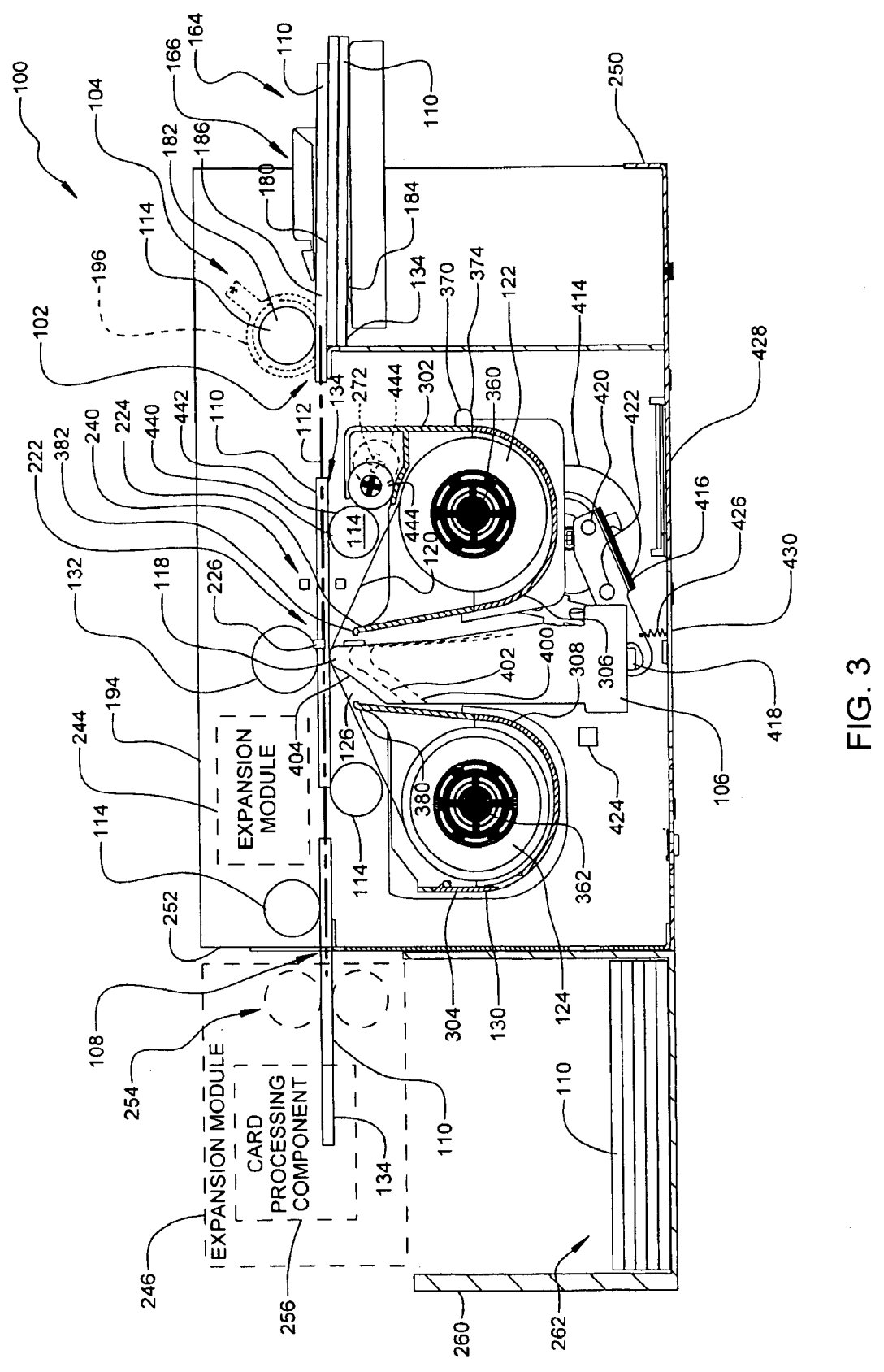

A general description of identification card printer 100 in accordance with embodiments of the present invention will be initially provided with reference to FIGS. 2 and 3. FIG. 2 is a schematic diagram of printer 100 and FIG. 3 is a simplified front view of printer 100 with selected components depicted in cross-section. In general, printer 100 includes a card input 102, a card transport 104, a printhead 106, and a card output 108. Cards 110 are received by card transport 104 at card input 102. Card transport 104 feeds cards 110 individually along a print path 112. Print path 112 is preferably substantially flat between card input 102 and card output 108 to avoid substantially bending the rigid or semi-rigid card substrates 110 that could damage cards 110.

Card transport 104 includes card feed rollers 114 that are driven by a motor 116 through gear and pulley arrangements. It should be understood that separate motors can be used in different stages of card delivery through printer 100. For example, one motor 116 can be used to drive the feeding of card 110 through input 102, and another motor 116 can be used to drive the feeding of card 110 thereafter through printer 100. Card feed rollers 114 drive card 110 along print path 112. Card support plates or rails (not shown) can also be used to provide support to card 110 during transport along print path 112 by card transport 104.

Printhead 106 is positioned below print path 112 and includes upwardly facing print elements 118. A supply of thermal print ribbon 120 extends between a supply spool 122 and a take-up spool 124, across a gap 126, in which printhead 106 is positioned, and over print elements 118. Supply and take-up spools 122 and 124 are preferably positioned adjacent opposite sides of printhead 106 and below print path 112. As will be discussed in greater detail below, print ribbon 120 can be contained in a removable ribbon cartridge 130 illustrated in partial cross-section in FIG. 3.

During a printing operation, card 110 is fed by card transport 104 between print ribbon 120 and a platen 132. Pressure is applied to print ribbon 120 and a bottom-facing print surface 134 of card 110 by platen 132 and printhead 106. Print elements 118 are selectively energized to heat portions of print ribbon 120 in contact therewith to cause print material or dye from print ribbon 120 to transfer to surface 134 of card 110 to form the desired image thereon. The printed card 110 can then be discharged through card output 108.

Printer 100 includes a controller 140 that is configured to control the operations of printer 100 including one or more motors 116 driving card feed rollers 114 of card transport 104, one or more motors 142 controlling feeding of print ribbon 120 between supply and take-up spools 122 and 124, the selective energization of print elements 118 of printhead 106, and other components of printer 100, in response to a print job provided by a card producing application 144. It should be understood that motors 116 and 142 of FIG. 2 provide a simplified illustration of the means by which card transport 104 and supply and take-up rolls 122 and 124 are driven. Fewer or additional motors can be used as desired. Additionally, motors 116 and 142 can operate to drive different components than those depicted in FIG. 2. For example, motor 142 can be configured to drive take-up roll 124 rather than supply roll 122.

Card producing application 144 can run on a computer 146, or be contained in printer memory 148 for execution by controller 140. The print job typically includes card processing instructions, such as print instructions, data writing instructions, data reading instructions, and other card processing instructions in accordance with normal methods.

Additional instructions and input signals can be provided to controller 140 from input 150 (FIG. 2), which can be input controls 152 in the form of buttons 154 or 156 (FIG. 1) or other input device. Controller 140 can also provide information to a user on a display 158 of control panel 156.

Firmware 160 for printer 100 is preferably stored in memory 148 of printer 100, such as flash memory, and is executed by controller 140 to operate printer 100. Firmware 160 can be upgraded periodically with revised versions. In accordance with one embodiment of the invention, encrypted firmware upgrades are downloaded into memory 148 of printer 100 through, for example, computer 146. A loader program 162 stored in memory 148 of printer 100, such as flash memory, is configured to decrypt the encrypted firmware upgrade and load the decrypted firmware upgrade into memory 148 of printer 100 to complete the upgrade of firmware 160.

Figure 4:
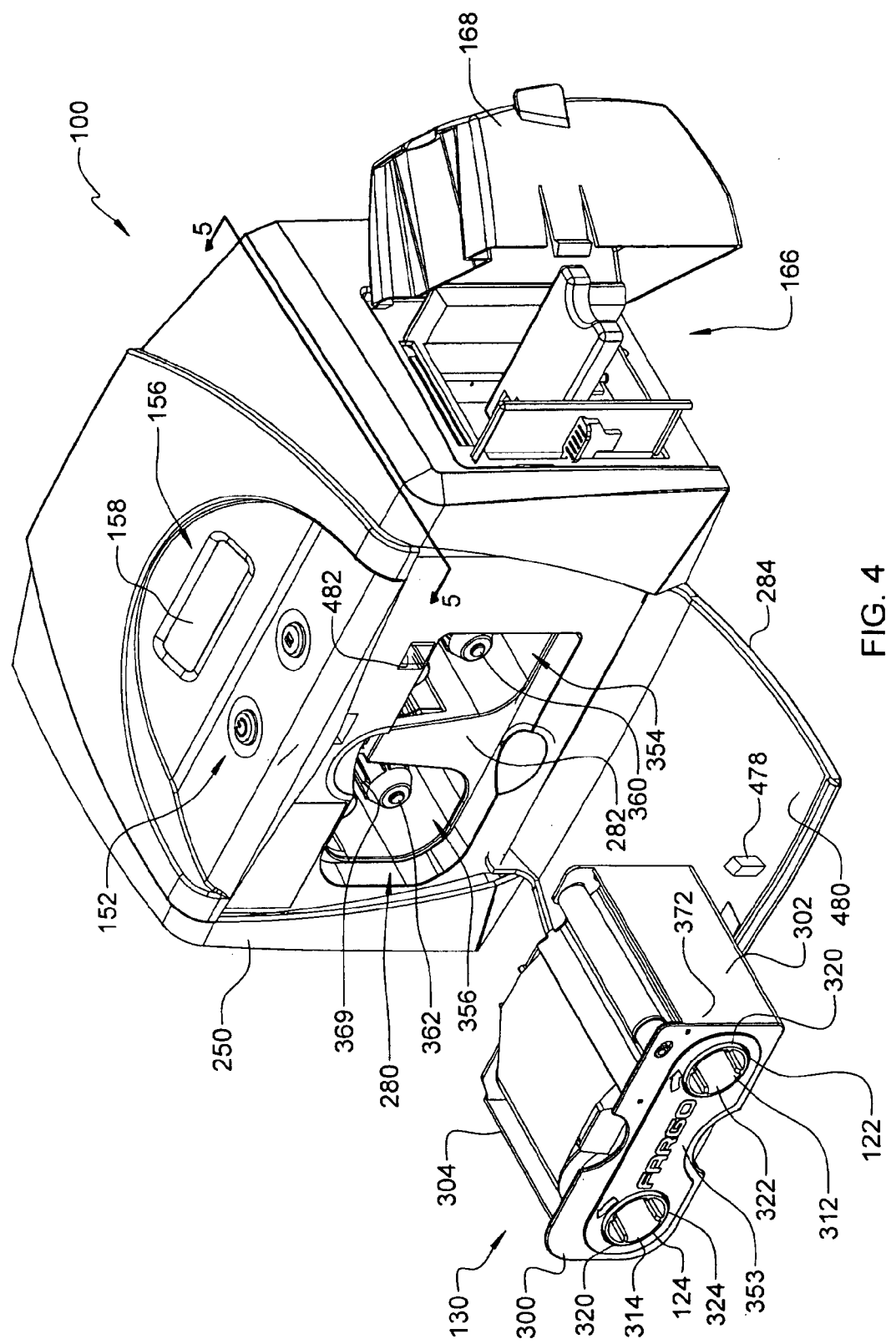
FIG. 4 is a perspective exploded view of an identification card printer and a ribbon cartridge, in accordance with various embodiments of the invention.
Figure 5:
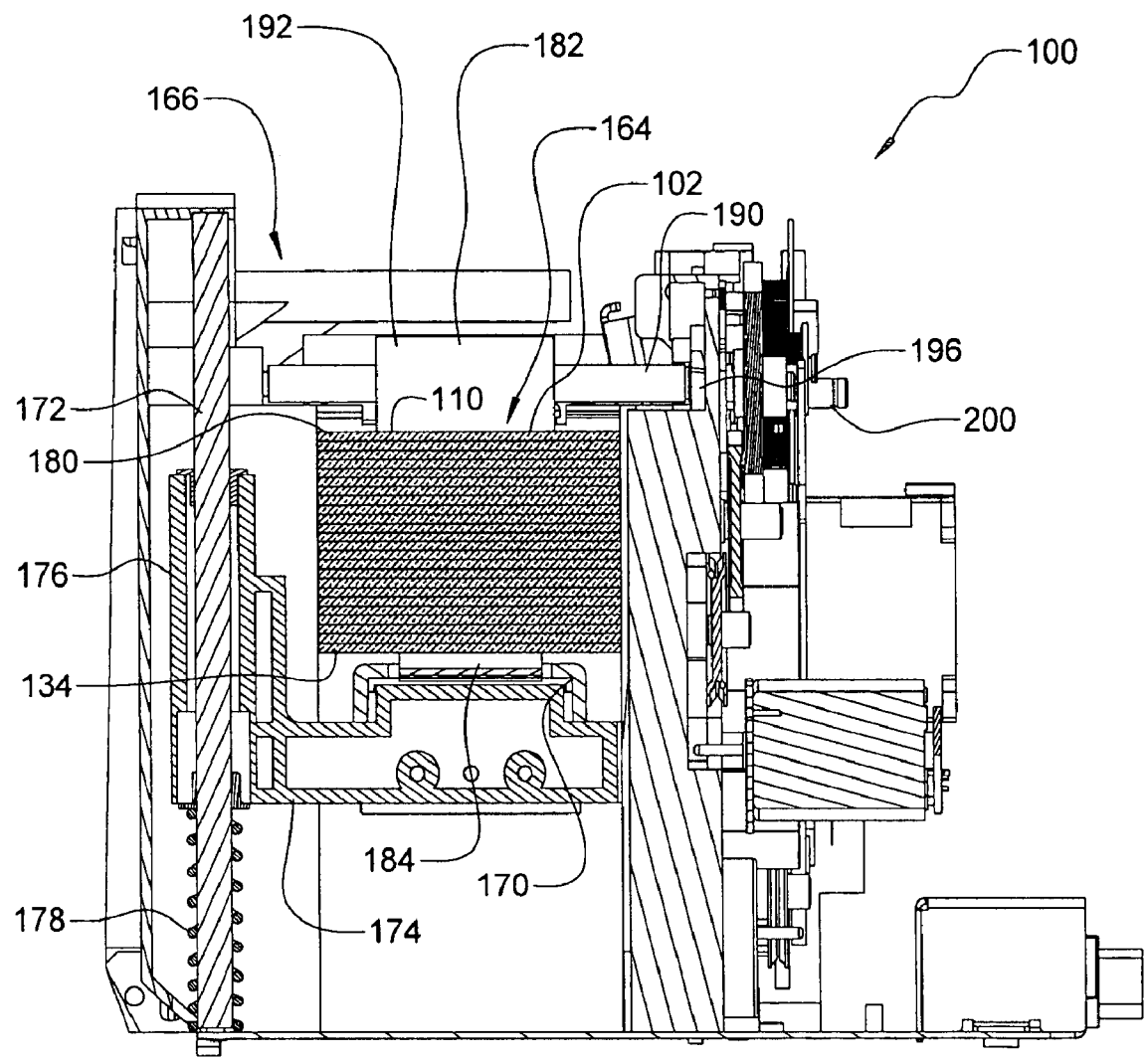
FIG. 5 is a cross-sectional view of the printer of claim 4 taken generally along line 5—5.

Individual cards 110 can be provided to card input 102 in a stack 164 of cards 110 that is contained in a card hopper 166, embodiments of which are depicted in FIGS. 3–5. FIG. 4 is a perspective view of printer 100 including hopper 166, and FIG. 5 is a cross-sectional view of hopper 166 generally taken along line 5—5 of FIG. 4, but with the addition of card stack 164. Cards 110 of card stack 164 are oriented with surface 134, on which an image is to be printed, facing downward. Unlike conventional printers that stack cards with the print surface facing upward, the orientation of cards 110 of card stack 164 of the present invention assists in preventing dust from accumulating on print surface 134 over time. This results in a cleaner print surface 134, which enhances the quality of the image that can be printed thereon. Additional dust protection for card stack 164 can be provided by a cover 168, shown open in FIG. 4.

Stack of cards 164 is supported by a base member 170 of hopper 166 that connects to a rod 172 through an arm 174. Arm 174 includes a cylindrical portion 176 through which rod 172 extends. Cylindrical portion 176 is configured to slide along rod 172 to allow base member 170 to move up and down relative to card input 102.

A biasing mechanism 178, depicted as a coil spring, applies an upwardly directed force to the base member, which in turn applies the force to card stack 164. Biasing mechanism 178 directs a top card 180 of card stack 164 against a card feed roller 182 of card transport 104 at card input 102, as shown in FIG. 3. Top card 180 can then be fed by card transport 104 from card input 102 and along print path 112.

Additional biasing mechanism can be provided to ensure proper contact with card feed roller 182 of card transport 104. For example, base member 170 can include a leaf spring 184, or other suitable spring or biasing mechanism, that is configured to apply an additional force to a front portion 186 of card stack 164. This causes front portion 186 of card stack 164 to lift slightly from base member 170, which assists in the feeding of top card 180 through card input 102 by card transport 104.

In accordance with one embodiment of the invention, base member 170 can be temporarily latched in a loading position by pushing down on lever 187 (FIG. 4), which is connected to base member 170 and arm 174, to lower base member against the bottom 188 (FIG. 5) of hopper 166. A suitable latching mechanism temporarily holds base 170 in the loading position. The latching mechanism preferably automatically releases base member 170 from the loading position when cover 186 (FIG. 4) is closed due to actuation of the latching mechanism by, for example, latch 189 of cover 186. Biasing mechanism 178 then moves base member to the card feeding position shown in FIG. 5.

Figure 6:
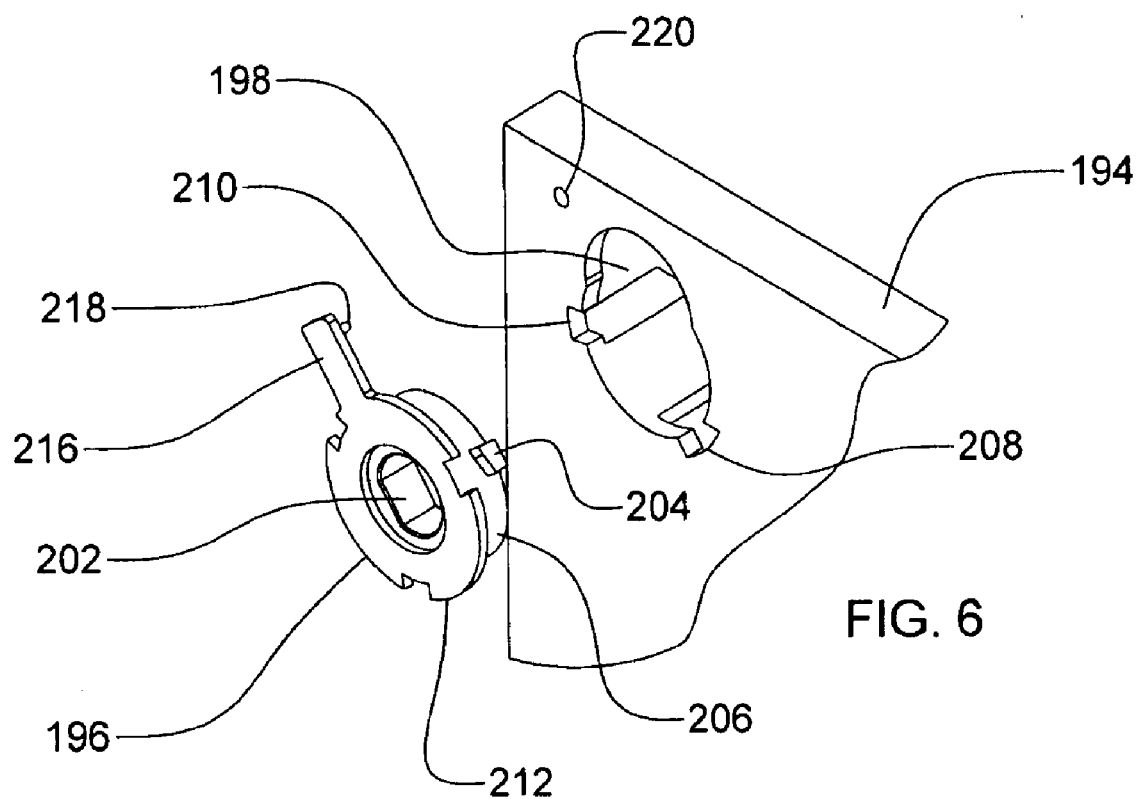
FIGS. 6 and 7 are exploded and assembled views of a bushing and a side wall of an identification card printer, in accordance with various embodiments of the invention.
Figure 7:
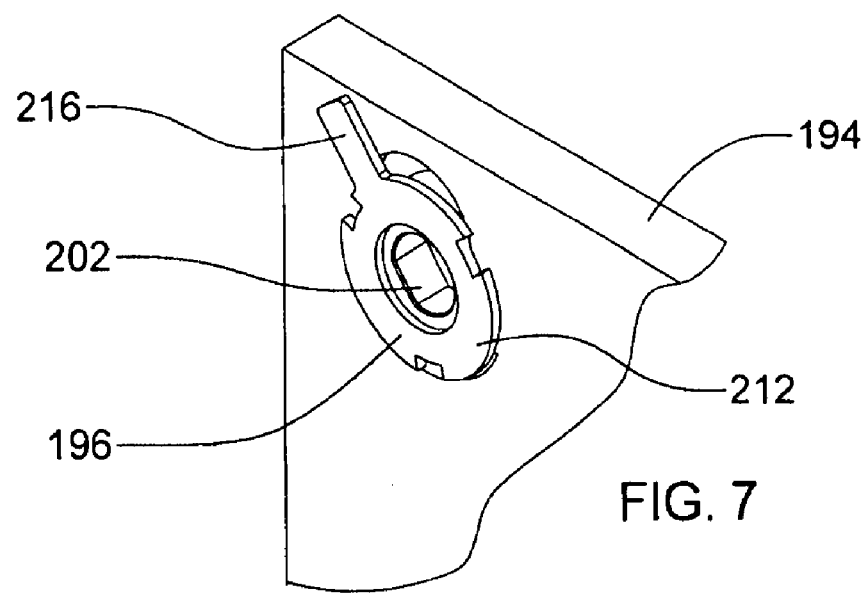

As mentioned above, card transport 104 preferably includes a plurality of feed or drive rollers 114 that are configured to transport top card 180 along print path 112. Feed rollers 114 generally include a shaft 190 that extends through a larger diameter card gripping member 192 and is supported by side walls of printer 100, as shown in FIG. 5. In accordance with one embodiment of the invention, card feed rollers 114 are mounted to a side wall 194 of printer 100 by a twist-lock bushing 196, as shown in FIGS. 3 and 5. A perspective exploded view of bushing 196 displaced from side wall 194 is provided in FIG. 6 and a perspective view of bushing 196 attached to side wall 194 is provided in FIG. 7. Side wall 194 includes a large opening 198 through which shafts 190 of feed rollers 114 of card transport 104 can extend. In accordance with one embodiment of the invention, card gripping member 192 is capable of extending through opening 198 of side wall 194. This feature simplifies assembly of printer 100 by allowing card feed rollers 114 to be installed through a single side wall 194 rather than having to extend each end of shaft 190 through the side walls of the printer from within the interior of the printer.

Once feed roller 114 is in position with shaft 190 extending through opening 198 of side wall 194, an end 200 of shaft 190 is received by central bore 202 of bushing 196. Bushing 196 is then secured to side wall 194 to complete the mounting of end 200 of feed roller 114 to side wall 194.

In accordance with one embodiment of the invention, bushing 196 includes tab members 204 that extend from cylindrical portion 206. Two of the preferably at least three tab members 204 are configured to be received in slots 208 and 210 adjacent opening 198 in side wall 194, while the third tab member 204 is allowed to fall within opening 198 in side wall 194. In accordance with one embodiment of the invention, tab members 204 have different sizes and/or shapes such that each can only be inserted into one of the corresponding slots 208 and 210 to ensure proper orientation of bushing 196 during installation. Once tab members 204 are inserted in slots 208 and 210, a shoulder 212 of bushing 196 engages outside surface 214 of side wall 194 and prevents further insertion of cylindrical portion 206 through side wall 194. Bushing 196 can be locked into place on side wall 194 by twisting or rotating bushing 196 about an axis that is concentric to central bore 202, which causes side wall 194 to be pinched between shoulder 212 and tab members 204.

Bushing 196 can also include an arm 216 that includes a protrusion 218 that is received by an aperture 220 in side wall 194 when bushing 196 is properly oriented to side wall 194. In addition to providing an alignment feature, arm 216 and protrusion 218 also operate to further lock bushing 196 in the desired position relative to side wall 194.

As mentioned above, thermal print ribbons 120 are typically divided up into different color frames or panels along its length. The frames or panels repeat in a sequence or group consisting of a yellow panel, followed by a magenta panel, which is followed by a cyan panel. In addition, a black resin frame or panel can be provided in sequence of the color panels, if desired. Printhead 106 selectively prints image lines to surface 134 of card 110 from the panels of ribbon 120 to form color images on card 110 in a conventional manner under control of controller 140.

One embodiment of printer 100 includes a ribbon sensor 222, shown in FIGS. 2 and 3, that is positioned adjacent print ribbon 120 and is configured to detect the ribbon panels. Ribbon sensor 222 is preferably positioned adjacent printhead 106 within gap 126 and includes an emitter 224 and a receiver 226 that are positioned on opposite sides of print ribbon 120, as shown in FIG. 3 and in the top and side schematic views of FIGS. 8 and 9, respectively. In accordance with one embodiment of the invention, a component of ribbon sensor 222, such as emitter 224, is mounted to printhead 106, as shown in FIG. 3. Alternatively, receiver 226 can be mounted to printhead 106. This positioning of ribbon sensor 222 in close proximity to printhead 106 assists in providing accurate positioning of individual panels of ribbon 120 relative to printhead 106, which allows for efficient use of the ribbon 120.

Emitter 224 preferably includes a light emitting diode (LED). Light produced by the LED passing through print ribbon 120 is detected by receiver 126. A signal from receiver 126 in response to the detected light, indicates the color of the panel through which the light has passed. The signal is provided to controller 140, as indicated by line 228 of FIG. 2. Controller 140 controls the feeding of print ribbon 120 through control of bi-directional motor 142 in response to the signal 228 to align the desired panel with printhead 106. In accordance with one embodiment of the invention, the LED of emitter 224 emits blue light having a wavelength of approximately 470 nanometers (nm), which has proved to provide the widest dispersion of the resultant signal from receiver 226 between the different panels of ribbon 120 for accurate panel detection.

Figure 8:
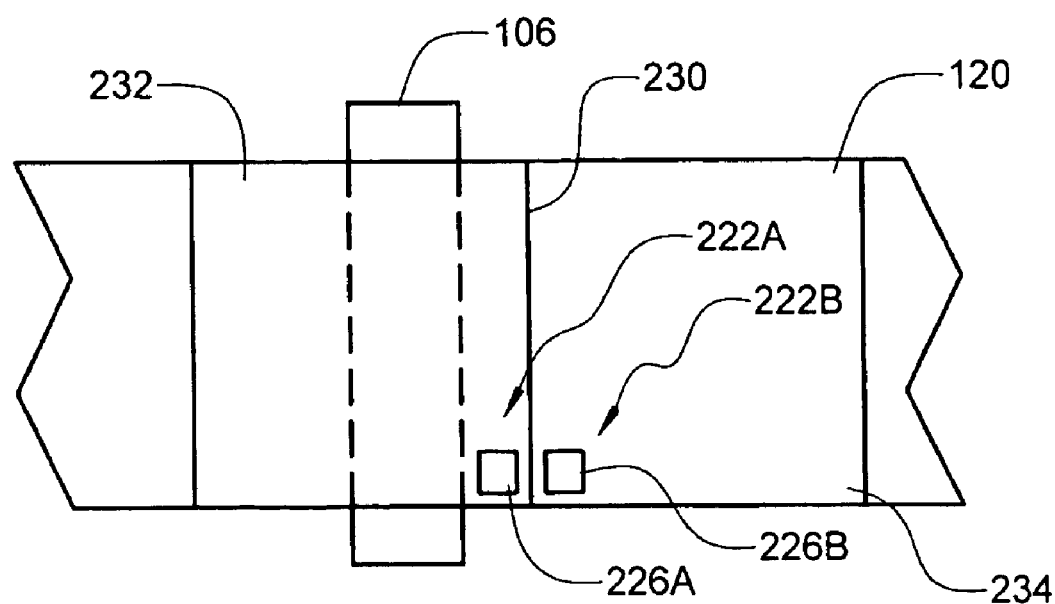
FIGS. 8 and 9 are top and side schematic views, respectively, of a printhead, a thermal print ribbon and ribbon sensors, in accordance with various embodiments of the invention.
Figure 9:
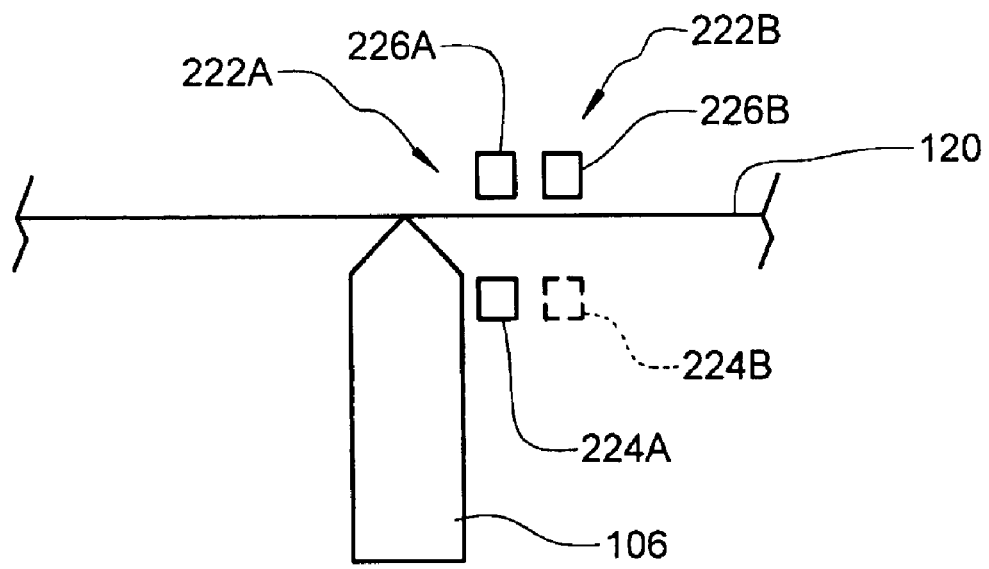

In accordance with another embodiment of the invention, printer 100 includes a plurality of ribbon sensors 222, such as sensors 222A and 222B illustrated in FIGS. 8 and 9. Sensor 222A can include an emitter 224A and a receiver 226A, and sensor 222B can include an emitter 224B and a receiver 226B, which operate as described above. Alternatively, sensor 222B can include only a receiver 226B (i.e. without emitter 224B shown in phantom lines) that is positioned in close proximity to emitter 224A, such that it can utilize the light emitting from emitter 222A to provide the desired panel detection.

Sensors 222A and 222B are preferably positioned to allow for detection of a location of a transition 230 between separate panels 232 and 234 of ribbon 120. For example, sensors 222A and 222B are preferably positioned such that when sensor 222A detects panel 232 of one color and sensor 222B detects panel 234 of another color, it is known that transition 230 is positioned immediately between sensors 222A and 222B. If necessary, controller 140 can feed ribbon 120 in either a forward or backward direction to detect the location of transition 230 using sensors 222A and 222B. Once the position of transition 230 is determined, controller 140 can align printhead 106 as desired relative to a particular panel of ribbon 120. This allows printer 100 to utilize the entire ribbon panel, which reduces waste and extends the life of ribbon 120. This is particularly useful when printer 100 is powered on, which allows printer 100 to locate the transition 230 and position the panels of ribbon 120 relative to printhead 106 as desired.

Printer 100 can also include a card sensor 240 that is positioned adjacent print path 112, as shown in FIG. 2. Card sensor 240 is configured to detect the feeding of a card 110 by card transport 104 along print path 112. Card sensor 240 includes an output signal represented by arrow 242, which is provided to controller 140. Controller 140 uses signal 242 to position card 110 as desired using card transport 104 relative to printhead 106 and other components of printer 100.

Printer 100 can also include internal and/or external expansion modules 244 and 246, respectively, as illustrated schematically in FIG. 3. Internal expansion module 244 is positioned in line with print path 112 between printhead 106 and card output 108 or between printhead 106 and card input 102. Internal expansion module 244 can be received in an expansion module bay 248 of a housing 250 of printer 100, shown in the front plan view of FIG. 10.

External expansion module 246 preferably attaches to an end 252 of printer 100 adjacent card output 108. External expansion module 246 includes a card receiver 254 in card hand-off alignment with card output 108.

Each expansion module 244 and 246 generally includes a card processing component 256, as illustrated in external expansion module 246 of FIG. 3. Card processing component 256 provides additional card processing functions for printer 100. Card processing component 256 can be, for example, a data encoder configured to write data to a memory chip embedded in card 110, a magnetic stripe reader configured to read data on a magnetic stripe of card 110, a magnetic stripe writer configured to write data to a magnetic stripe of card 110, a card flipper configured to flip card 110 to allow for processing of both sides of card 110, a card laminator configured to apply an overlaminate material to the surface of card 110, or other card processing component. Card processing component 256 can be controlled by controller 140 or by a separate controller of the expansion module.

Figure 10:
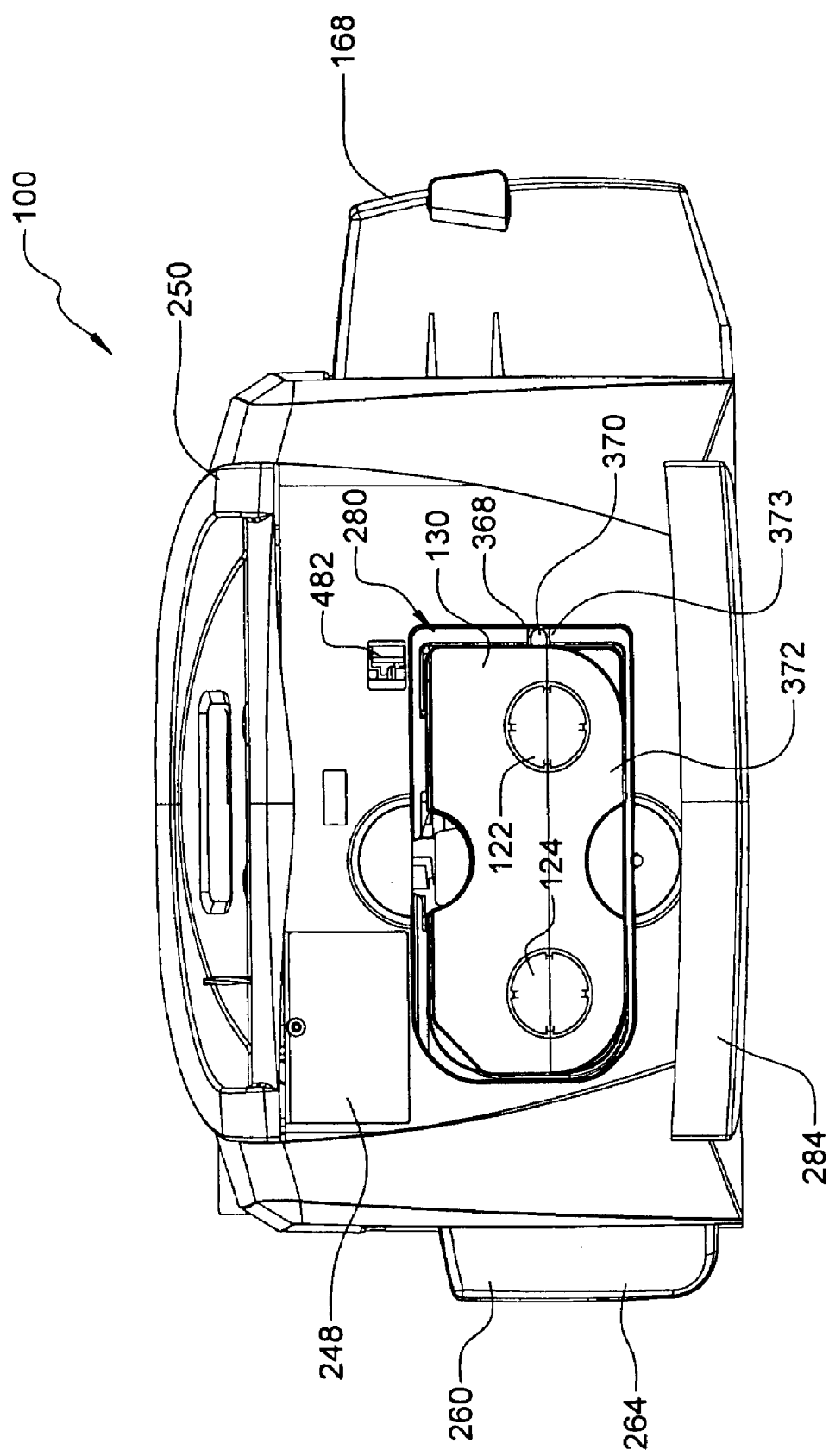
FIG. 10 is a front plan view of an identification card printer with an open front cover, in accordance with various embodiments of the invention.

Printer 100 can also include an output hopper 260 at end 252, as shown in FIG. 3. A removable cover 261 can substantially enclose output hopper 260 as shown in FIG. 10. Output hopper 260 is generally positioned below card output 108 and is configured to collect cards 110 discharged therethrough. One advantage of the present invention is that the collection of cards 110 in output hopper 260 is in the form of first-in-first-out order. In other words, each card 110 is preferably collected in output hopper 260 with the print surface 134 on which an image was printed by printhead 106 facing downward. As a result, bottom card 264 in the stack 262 of cards 110, which was the first card 110 processed by printer 100, will be the top card in the stack 262 having its print surface 134 facing upward when the stack 262 is removed from output hopper 260 and turned over. As a result, the cards 110 in the stack 262 are presented to the user in first-in-first-out order. This is preferred over the last-in-last-out order of conventional card printers, such as printer 600 shown in FIG. 21, where the printed surface 612 of the first card processed by printer 600 is located at the bottom of stack of cards 626 collected in hopper 622 with the printed surface 612 facing upward. As a result, the last-in-last-out card stack 626 must be reorganized to place the cards 602 in first-in-first-out order with the print surface 612 of the first processed card 602 in view or facing upward.

The print job provided by application 144 generally includes print image data that provides instructions for controlling printhead 106 through controller 140 to print the image on surface 134 of card 110. The instructions determine which print elements 118 of printhead 106 are active during the printing process. For proper printing of the image on surface 134 of card 110, the active print elements 118 of printhead 106 that are to be energized to print the image must extend across a width of the card 110. If they do not, the printed image will generally not be properly aligned with surface 134 of card 110. Additionally, it will not be possible to provide full edge-to-edge printing of the image over surface 134 of card 110.

Typically, each printer 100 must be factory tested to ensure that print elements 118 and card 110 are properly aligned during printing operations. If they are misaligned, a mechanical adjustment to the position of printhead 106 relative to card 110 is typically required. This may involve moving the position of printhead 106, or adjusting card transport 104 to change the position of card 110 at printhead 106.

Figure 11:
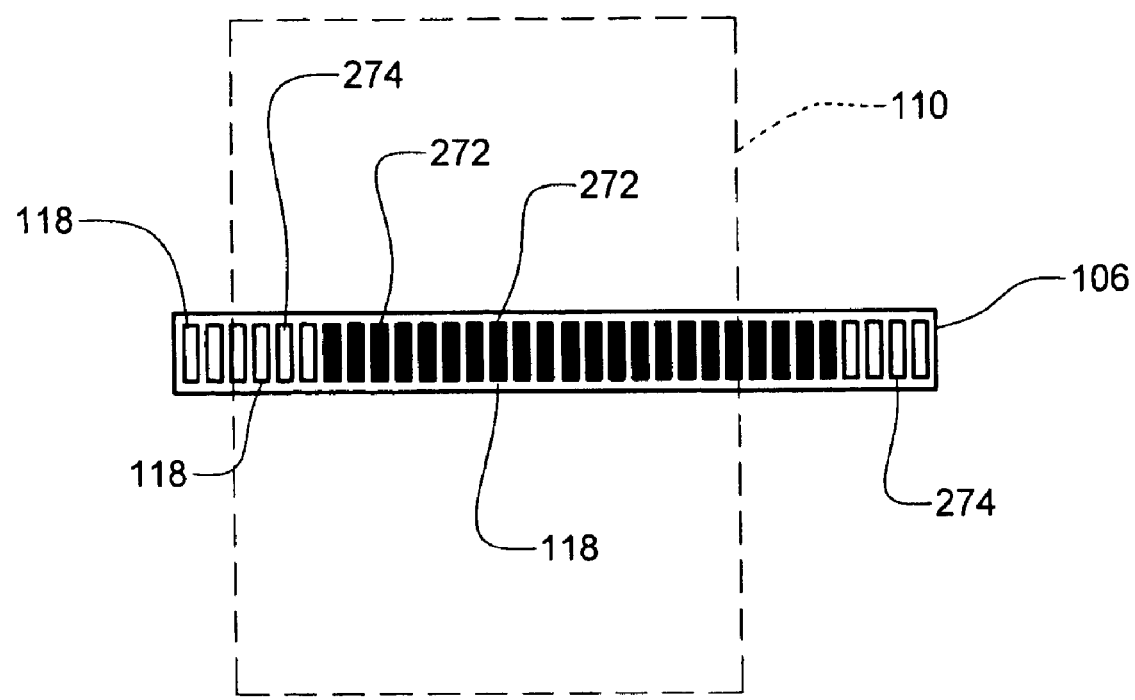
FIGS. 11 and 12 are schematic diagrams respectively illustrating misalignment and alignment between active print elements of a printhead and a card.
Figure 12:
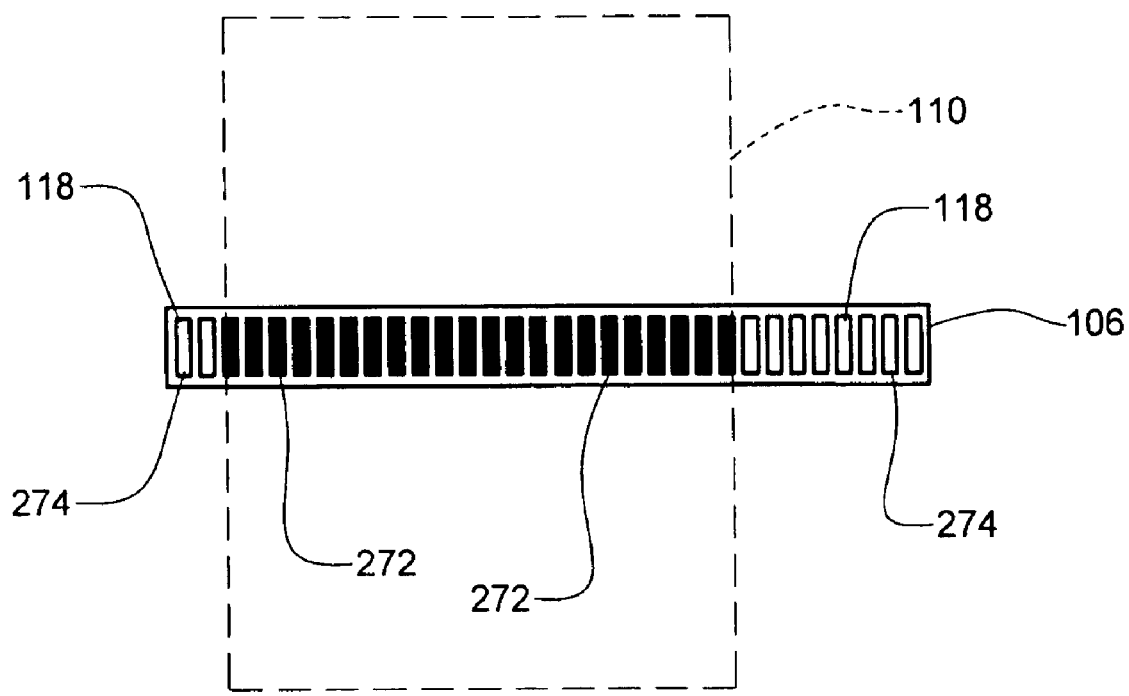

The present invention provides a method of aligning print elements 118 of printhead 106 with card 110 without mechanical adjustment to printer 100, as shown in FIG. 2. Instead, an offset value 270 is determined and stored in memory 148 (e.g., flash memory) of printer 100, shown in FIG. 2. Offset value 270 provides an adjustment to print elements 118 of printhead 106 that will be set as active and thus, be energized during print operations to print the image to surface 134 of card 110. FIG. 11 is a simplified top view of print elements 118 of printhead 106 relative to a card 110 (shown in phantom). The initially active print elements 118 are represented by shaded boxes 272, whereas the non-shaded boxes 274 represent non-active print elements 118. Accordingly, FIG. 11 illustrates a misalignment between active print elements 272 and card 110 of approximately four print elements 118. Accordingly, an offset value 270 of minus four would be set for the example of FIG. 11 to shift the active print elements 272 to the left by four print elements 118 resulting in the alignment of active print elements 272 with card 110, as illustrated in FIG. 12. Accordingly, offset value 270 adjusts the print elements 118 that are used by printhead 106 to process a print job such that the active print elements 118 are properly aligned with card 110 to ensure full edge-to-edge printing capability and proper alignment of the printed image and card 110.

During a print operation, the print job is received from the card processing application 144, from which print image data is generated that designates the active print elements 272. Next, offset value 270 is received from printer 100. Offset value 270 is then used to designate a modified set of active print elements 118, such as elements 272 shown in FIG. 12. Finally, the modified set of active print elements 118 are used to process the print job resulting in printing of the image represented by the print job in proper alignment with surface 134 of card 110 due to the proper alignment between active print elements 118 of printhead 106 and card 110.

In accordance with another embodiment of the invention, the original active print elements 118 designated by the print image data generated from the print job, such as elements 272 shown in FIG. 11, are initially left unmodified. Next, offset valued 270 is received from printer 100 immediately prior to processing the print job from application 144 with printer 100. Finally, the print image data is re-generated to designate the modified set of active print elements 118 (elements 270 of FIG. 12) of printhead 106 that are offset from the original set of active print elements by the offset value 270.

As mentioned above, print ribbon 120 can be contained in a removable ribbon cartridge 130 (FIG. 4) that contains the supply and take-up spools 122 and 124. Ribbon cartridge 130 is received in a cartridge receiver 280 of printer housing 250, as shown in FIGS. 4 and 10. Cartridge receiver 280 is preferably accessed through a front face 282 of housing 250 to provide front-loading of cartridge 130 in printer 100. A front cover 284 of housing 250 can cover cartridge receiver 280, as shown in FIGS. 1 and 4.

Figure 13:
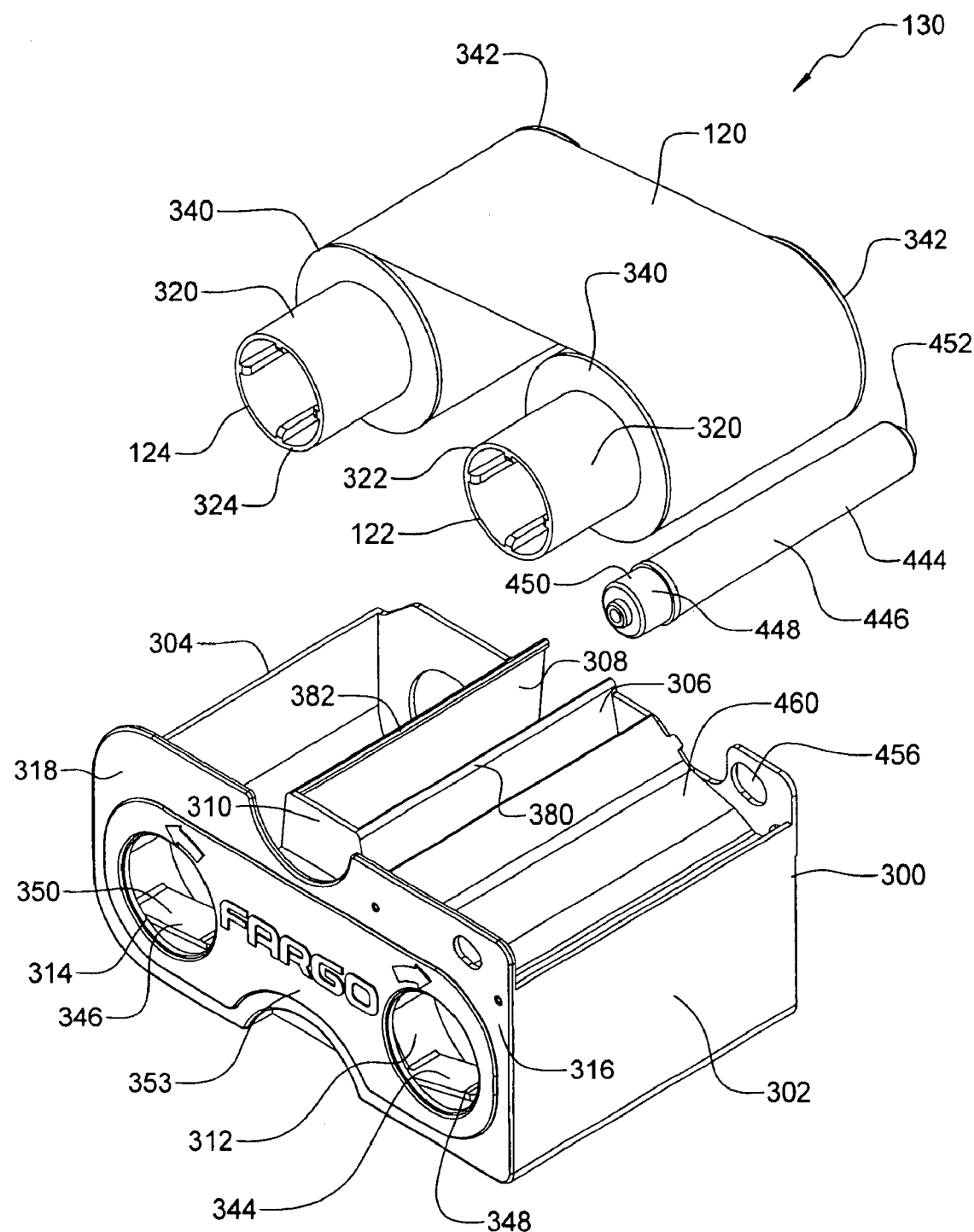
FIG. 13 is an exploded perspective view of a ribbon cartridge in accordance with various embodiments of the invention.
Figure 14:
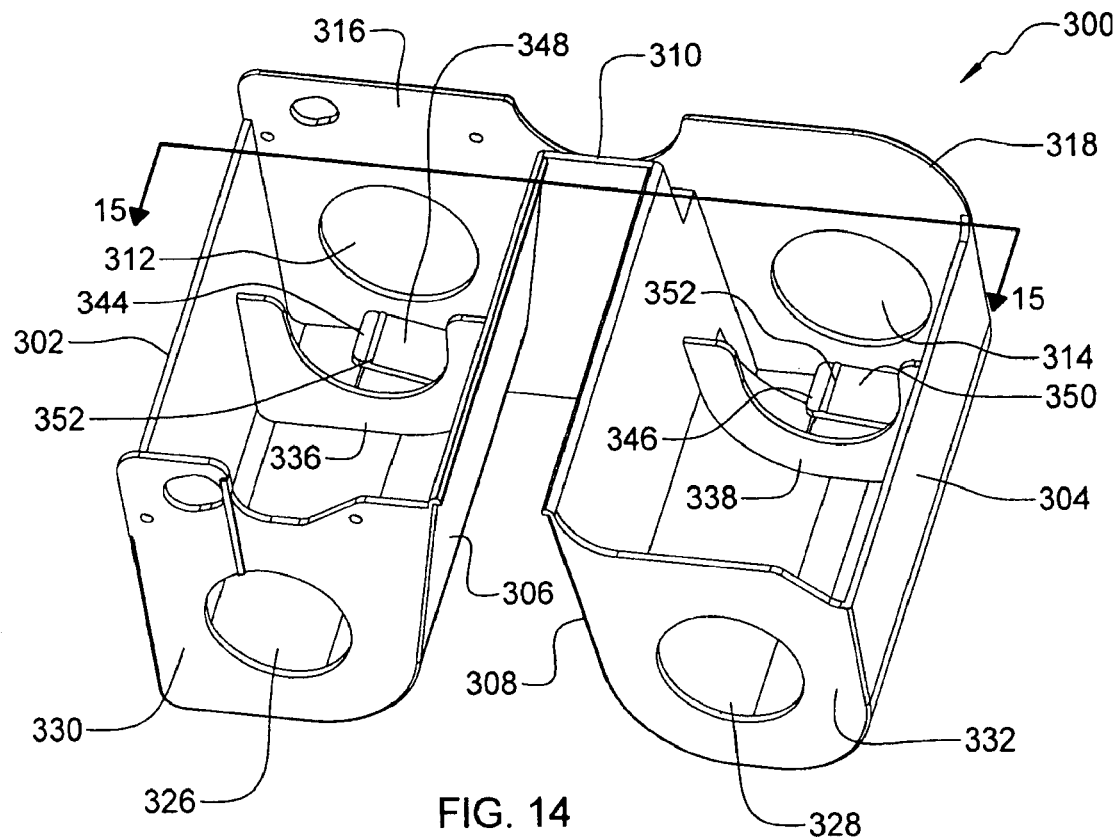
FIG. 14 is a perspective view of a cartridge housing in accordance with various embodiments of the invention.
Figure 15:
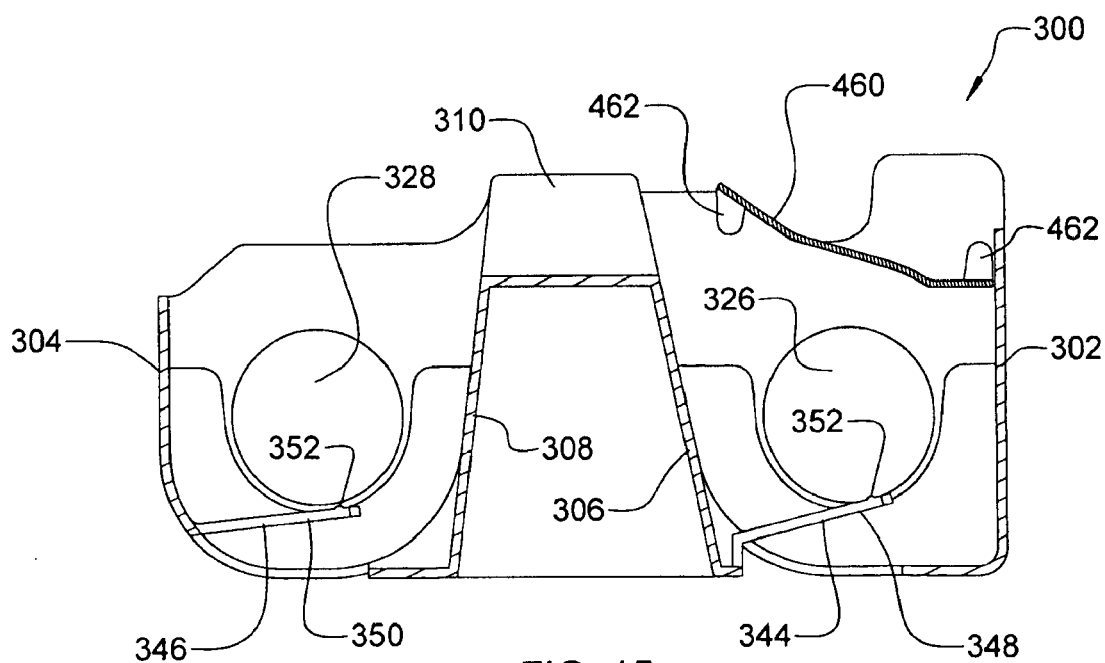
FIG. 15 is a cross-sectional view of the cartridge housing of FIG. 14 taken generally along line 15—15.
Figure 16:
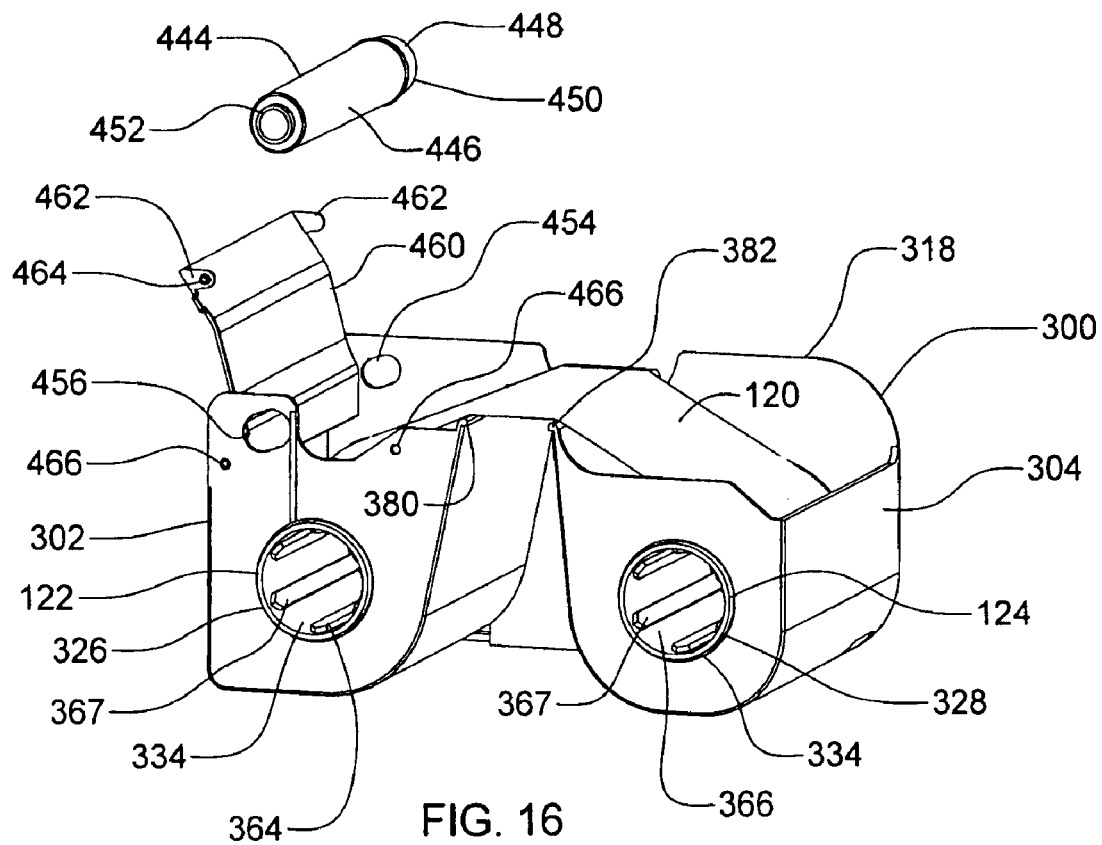
FIG. 16 is a rear perspective view of a ribbon cartridge with a cleaner roller exploded therefrom, in accordance with embodiments of the invention.
Figure 17:
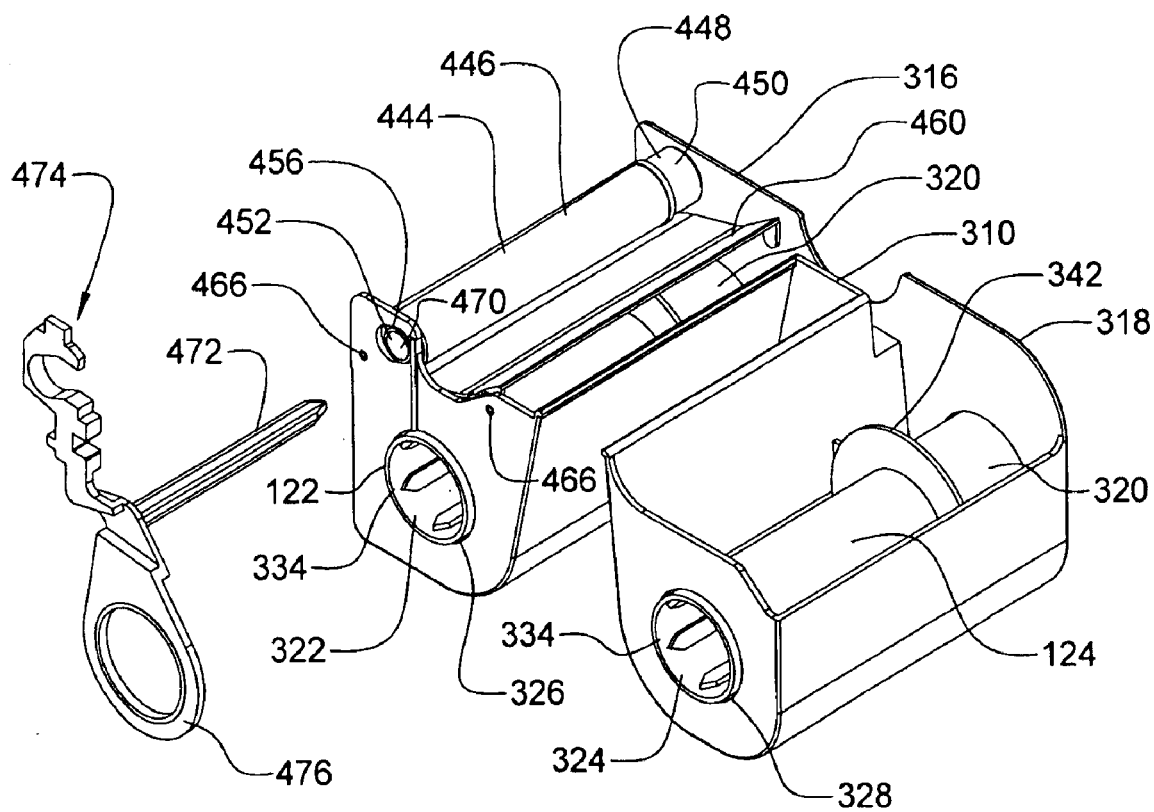
FIG. 17 is a rear perspective view of a ribbon cartridge and an actuating member in accordance with various embodiments of the invention.

FIGS. 13–17 provide various views of ribbon cartridge 130. Ribbon cartridge 130 includes a cartridge housing 300 that is preferably formed of a single piece of semi-flexible plastic. Housing 300 generally includes a supply spool enclosure 302 containing supply spool 122 and a take-up spool enclosure 304 containing take-up spool 124. Supply and take-up spool enclosures 302 and 304 each include an interior side wall 306 and 308, respectively, that are joined together by a front plate 310, as shown in FIG. 14. Openings 312 and 314 in front walls 316 and 318 of the supply and take-up spool enclosures 302 and 304, shown in FIG. 14, respectively receive front portions 320 of spool cores 322 and 324 of supply and take-up spools 122 and 124, as shown in FIGS. 13 and 17. Similarly, openings 326 and 328 and rear walls 330 and 332 of supply and take-up spool enclosures 302 and 304, respectively receive rear portions 334 of cores 322 and 324 of supply and take-up spools 122 and 124, as shown in FIGS. 16 and 17.

Front core support walls 336 and 338 are provided in supply and take-up spool enclosures 302 and 304 to provide support of the front portion 320 of cores 322 and 324 of supply and take-up spools 122 and 124, respectively, as shown in FIGS. 14 and 15. Print ribbon 120 is wound on cores 322 and 324 of supply and take-up spools 122 and 124 between front and rear ribbon guides 340 and 342. Ribbon guides 340 and 342 also limit axial movement of supply and take-up spools 122 and 124 between rear walls 330 and 332 and front core support walls 336 and 338 of cartridge housing 300.

One problem encountered with ribbon cartridges of the prior art is that they require delicate handling to avoid unintentional unwinding of the print ribbon. Ribbon cartridge 130 of the present invention avoids this problem by providing spool rotation inhibitors 344 and 346, shown in FIGS. 14 and 15, that provide at least some resistance to the rotation of supply and take-up spools 122 and 124, respectively, while ribbon cartridge 130 is not installed in cartridge receiver 280 of printer 100.

In accordance with one embodiment of the invention, spool rotation inhibitors 344 and 346 are formed by tab members 348 and 350 that respectively extend from between front core support walls 336 and 338 and front walls 316 and 318 of supply and take-up spools enclosures 302 and 304 of cartridge housing 300. Tab members 348 and 350 are positioned to engage front portions 320 of spool cores 322 and 324 and provide frictional resistance to the rotation of supply and take-up spools 122 and 124. Ridges 352 can be formed on tab members 348 and 350 to provide the desired rotational resistance. The rotational resistance to supply and take-up spools 122 and 124 provided by rotation inhibitors 344 and 346 is overcome by motor 142 that drives the rotation of supply and take-up spools 122 and 124 when ribbon cartridge 130 is installed in cartridge receiver 280. Additionally, housing 300 includes a finger hold 353 to allow for the installation of ribbon cartridge 130 in cartridge receiver without touching ribbon 120.

Supply and take-up spool enclosures 302 and 304 of cartridge housing 300 are preferably shaped such that ribbon cartridge 130 can only be received by cartridge receiver 280 in the proper orientation. Thus, cartridge receiver 280 preferably includes a first chamber 354 that is configured to receive supply spool enclosure 302, and a second chamber 356 that is configured to receive take-up spool enclosure 304. First and second chambers 354 and 356 also preferably substantially conform to the exterior shape of supply and take-up spool enclosures 302 and 304, which are shown in the cross-sectional view of ribbon cartridge 130 of FIG. 3.

During installation of ribbon cartridge 130 and cartridge receiver 280, first and second drive shafts 360 and 362 (FIGS. 3 and 4) are respectively received within rear openings 364 and 366 of supply and take-up spools 122 and 124, shown in FIG. 16. Once ribbon cartridge 130 is installed in cartridge receiver 280, drive shafts 360 and 362 provide support for supply and take-up spools 122 and 124 and align them in the desired position.

Drive shafts 360 and 362 are driven by motor 142 under control of controller 140 to rotate supply and take-up spools 122 and 124 as desired to control the position of ribbon 120 and its panels relative to printhead 106, as well as to provide tension in ribbon 120. Drive shafts 360 and 362 each preferably includes longitudinal ridges 369 (FIG. 4) that are received between corresponding longitudinal ridges 367 of supply and take-up spool cores 322 and 324, shown in FIG. 16. Ridges 369 intermesh with ridges 367 to prevent slippage between shafts 360 and 362 and supply and take-up spools 122 and 124.

Cartridge receiver 280 can also include at least one cartridge receiving guide 368 that is configured to receive a corresponding cartridge loading guide 370 of ribbon cartridge 130 to provide vertical support of a front portion 372 of ribbon cartridge 130, as shown in FIG. 10. In accordance with one embodiment of the invention, cartridge receiving guide 368 includes a channel 373 and cartridge loading guide 370 includes a protrusion 374 (FIG. 3) extending from supply spool enclosure 302 of cartridge housing 300. During loading of ribbon cartridge 130 in cartridge receiver 280, protrusion 374 slides in channel 373 and provides vertical support to front portion 372 of ribbon cartridge 130. Other types of cartridge receiving guides 368 and cartridge loading guides 370 can also be used.

Gap 126 (FIG. 3) is defined by interior side walls 306 and 308 and ribbon guides 380 and 382 (FIGS. 13 and 16) that are positioned between and above supply and take-up spools 122 and 124. The distance between ribbon guides 380 and 382 is preferably less than approximately 0.75 inches, but at least wide enough to accommodate printhead 106. Printhead 106, is covered by front cover plate 384 (FIG. 4) and is received within gap 126 (FIG. 3) as ribbon cartridge 130 is installed in cartridge receiver 280.

In order to facilitate easy installation and removal of ribbon cartridge 130 in cartridge receiver 280, printhead 106 is preferably movable in a vertical direction, as illustrated in FIG. 3. This vertical movement of printhead 106 is provided in part by slidably mounting printhead within printer 100. Preferably, printhead 106 includes a full-down position represented by dashed outline 400, in which printhead 106 is positioned during loading of ribbon cartridge 130 and cartridge receiver 280. In full-down position 400, printhead 106 is lowered below ribbon guides 380 and 382 to prevent interference between printhead 106 and print ribbon 120, which extends over ribbon guides 380 and 382 during installation of ribbon cartridge 130 and cartridge receiver 280. Once ribbon cartridge 130 is installed in cartridge receiver 280 (FIGS. 3 and 10), printhead 106 can be raised from full-down position 400 to an idle position represented by dashed outline 402, shown in FIG. 3. Prior to printing to surface 134 of card 110, printhead 106 is moved to a print position 404, which is illustrated in the solid lines of FIG. 3. When in print position 404, printhead 106 is raised relative to idle position 402 such that print elements 118 and print ribbon 120 overlaying print elements 118, are raised to a position that is adjacent print path 112 to allow for printing to surface 134 of card 110.

The raising and lowering of printhead 106 between the full-down position 400 and print position 404 is provided by cam mechanism 410, shown schematically in FIG. 2. Cam mechanism 410 is driven by motor 412 under control of controller 140. Cam mechanism 410 can take on many configurations. In accordance with one embodiment of the invention, cam mechanism 410 includes first and second cam members 414 and 416, shown in FIG. 3. First cam member 414 is rotatably driven by motor 412 (FIG. 2). Second cam member 416 is attached to printhead 106 at end 418 and engages first cam member 414 at end 420. The rotation of first cam member 414 by motor 412 causes second cam member 416 to pivot about axis 422, which in turn raises or lowers printhead 106 depending upon the direction of rotation of first cam member 414.

A printhead position sensor 424, shown schematically in FIGS. 2 and 3, can detect the position of printhead 106 and provide position information to controller 140. Controller 140 uses the position information to position printhead 106 as desired through control of motor 412 driving first cam member 414.

A printhead biasing mechanism 426, depicted as a spring, can be provided to resist raising of printhead 106 from full-down position 400. Additionally, base 428 of printer housing 250, shown in FIG. 3, includes an opening 430, through which adjustments to cam mechanism 410 can be made and printhead 106 can be removed.

One embodiment of printer 100 includes a card cleaner roller 440 that is positioned immediately below print path 112 between printhead 106 and card input 102, as shown in FIG. 3. Printer card cleaner roller 440 preferably operates as a feed roller 114 of card transport 104 and includes a debris-collecting surface 442. Debris-collecting surface 442 engages print surface 134 of card 110 as it is fed along print path 112 and removes dust and other debris from surface 134 prior to printing thereon by printhead 106. Printer card cleaner roller 440 can be cleaned periodically by a user of the printer 100.

One embodiment of card cartridge 130 includes a cleaner roller 444, shown in FIGS. 3, 13, 16 and 17, which operates to clean card cleaner roller 440 by removing debris from debris-collecting surface 442, which eliminates the need to clean, remove, or replace card cleaner roller 440. Cleaner roller 444 of ribbon cartridge 130 includes a debris-collecting surface 446 that is preferably more tacky than debris-collecting surface 442 of card cleaner roller 440. In accordance with one embodiment of the invention, debris-collecting surface 446 of cleaner roller 444 can include double-sided tape or an adhesive applied to a removable sleeve that is mounted to a core 448. Debris-collecting surface 446 can be renewed periodically, or cleaner roller 444 of ribbon cartridge 130 can be periodically replaced with another card cleaner roller 444 as needed.

Cleaner roller 444 includes front and rear ends 450 and 452 that respectively extend through apertures 454 and 456 in front and rear walls 316 and 330 of supply spool enclosure 302 of cartridge housing 300. Cleaner roller can be easily inserted and removed from cartridge housing 300 by simply bending cartridge housing slightly.

In accordance with one embodiment of the invention, cartridge housing 300 includes a removable cover 460 that covers a top portion of supply spool enclosure 302 and protects ribbon 320 from contact with debris-collecting surface 446 of cleaner roller 444, as shown in FIGS. 4, 15 and 16. Cover 460 preferably includes tab members 462 each having a protrusion 464 that is configured to be received within a corresponding aperture 466 of front and rear walls 316 and 330 of supply spool enclosure 302, as shown in FIGS. 14, 16 and 17.

Cleaner roller 444 is preferably actuated for contact with card cleaner roller 440 following installation of ribbon cartridge 130 and cartridge receiver 280. In accordance with one embodiment of the invention, rear end 452 of cleaner roller 444 includes an opening 470 that is configured to receive a rod 472 of an actuating member 474, shown in FIG. 17. Actuating member 474 generally operates to maintain cleaner roller 444 in contact with card cleaner roller 440 during operation of printer 100 when ribbon cartridge 130 is installed in cartridge receiver 280, as illustrated in FIG. 3. The phantom representations of rod 272 of actuating member 474 and cleaner roller 444, shown in FIG. 3, illustrate a receiving position for actuating member 474, in which rod 472 is positioned to extend through opening 470 of cleaner roller 444 as ribbon cartridge 130 is received in cartridge receiver 280.

One embodiment of actuating member 474 includes a ring member 476 that is rotatably mounted around a rear side of drive shaft 360. Actuating member 474 rotates about drive shaft 360 from the receiving position to a card cleaning position, where debris collecting surface 446 of cleaner roller 444 engages debris-collecting surface 442 of card cleaner roller 440, as shown in FIG. 3.

Movement of actuating member 474 between the receiving and card cleaning positions is preferably triggered by the closing of front cover 284 of printer housing 250. In accordance with an embodiment of the invention, this is accomplished by protrusion 478 that is mounted to an inside surface 480 of front cover 284, as shown in FIG. 4. Preferably, actuating member 474 is biased toward the receiving position. When front cover 284 is fully closed, protrusion 478 extends through opening 482 of housing 250 and engages a suitable linkage that moves actuating member 474 from the receiving position to the full card cleaning position thereby causing debris-collecting surface 446 of roller cleaner roller 444 to engage debris-collecting surface 442 of card cleaner roller 440 and rotate therewith during printing operations.

In accordance with another embodiment of the invention, a supply circuit 500 having a memory 502 is mounted to ribbon cartridge 130, as illustrated schematically in FIG. 2. One suitable supply circuit is the I-CODE1 produced by Philips. Memory 502 of supply circuit 500 contains information relating to print ribbon 120, such as a lot code identifying a lot of the ribbon 120, a supplier code identifying a supplier of ribbon 120 or ribbon cartridge 130, a ribbon type identifying parameters of print ribbon 120, a security code that can be used to prevent unauthorized use of ribbon cartridge 130, a printer configuration setting used to optimize printer settings such as printhead settings including those affecting image color and intensity, a number of prints completed by print ribbon 120, and/or a number of prints remaining or that can be printed by print ribbon 120.

Figure 18:
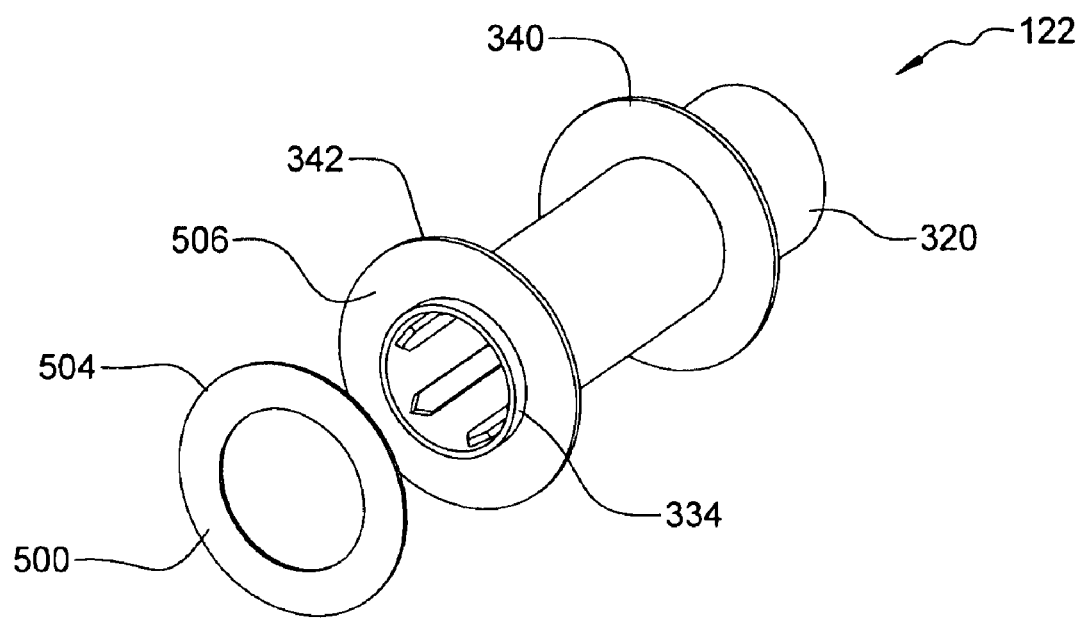
FIGS. 18 and 19 are exploded and assembled views of a ribbon spool and supply circuit, respectively, in accordance with various embodiments of the invention.
Figure 19:
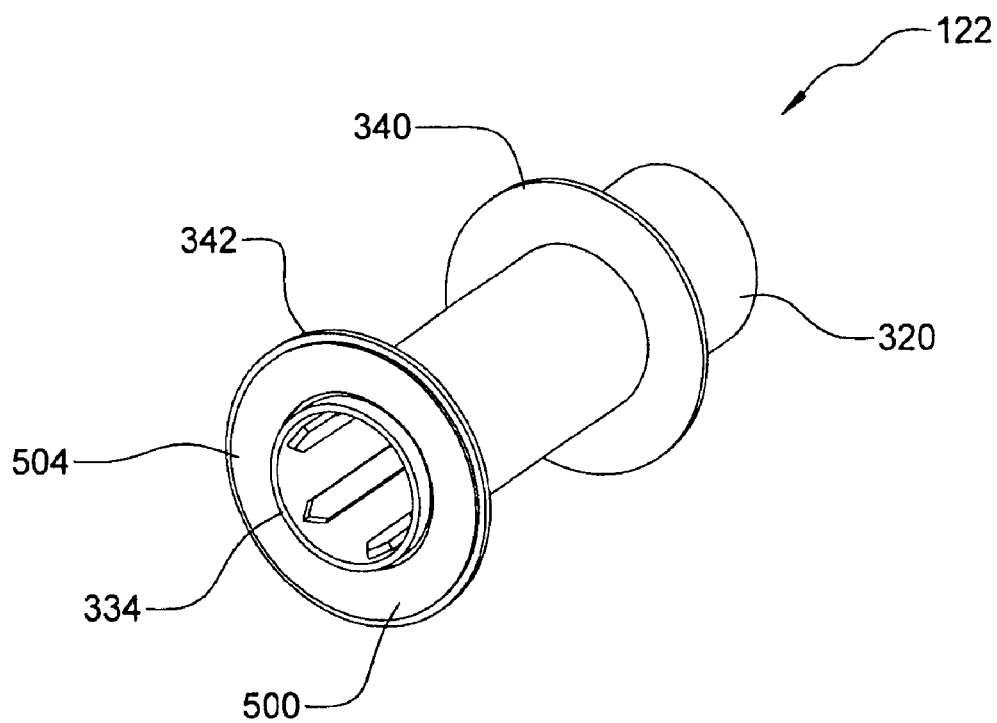

In accordance with one embodiment of the invention, supply circuit 500 can be mounted to either supply spool 122 or take-up spool 124, as illustrated in FIGS. 18 and 19. FIG. 18 is an exploded perspective view of supply circuit 500 mounted to supply spool 122, and FIG. 19 is an assembled view of supply circuit 500 mounted to supply spool 122. In accordance with one embodiment of the invention, supply circuit 500 is formed as a ring member 504 that is mounted to a rear-facing surface 506 of rear ribbon guide 342.

Printer 100 includes a supply circuit reader 510, shown schematically in FIG. 2. Controller 140 is configured to access or read the supply information contained in memory 502 of supply circuit 500 using supply circuit reader 510. The supply information is preferably accessed prior to feeding card 110 by card transport 104. Additionally, controller 140 can write data to memory 502 of supply circuit 500 through supply circuit reader 510. Supply circuit reader 510 communicates with memory 502 using conventional techniques including radio frequency (RF) communication methods.

Communications between controller 140 and supply circuit 500 through supply circuit reader 510 are preferably securely made using various encryption methods to protect the supply information. In accordance with one embodiment of the invention, the supply information contained in memory 502 of supply circuit 500 is encrypted in accordance with a first encryption method. In accordance with one embodiment of the invention, the supply information contained in memory 502 of supply circuit 500 is encrypted in a form that can be decrypted by controller 140. In accordance with another embodiment of the invention, supply circuit reader 510 includes a processor that is configured to decrypt the encrypted supply information and re-encrypt the supply information in accordance with a second encryption method. The first encryption method is preferably different from the second encryption method. Finally, the re-encrypted supply information is communicated to controller 140, which is configured to decrypt the re-encrypted supply information.

Figure 20:
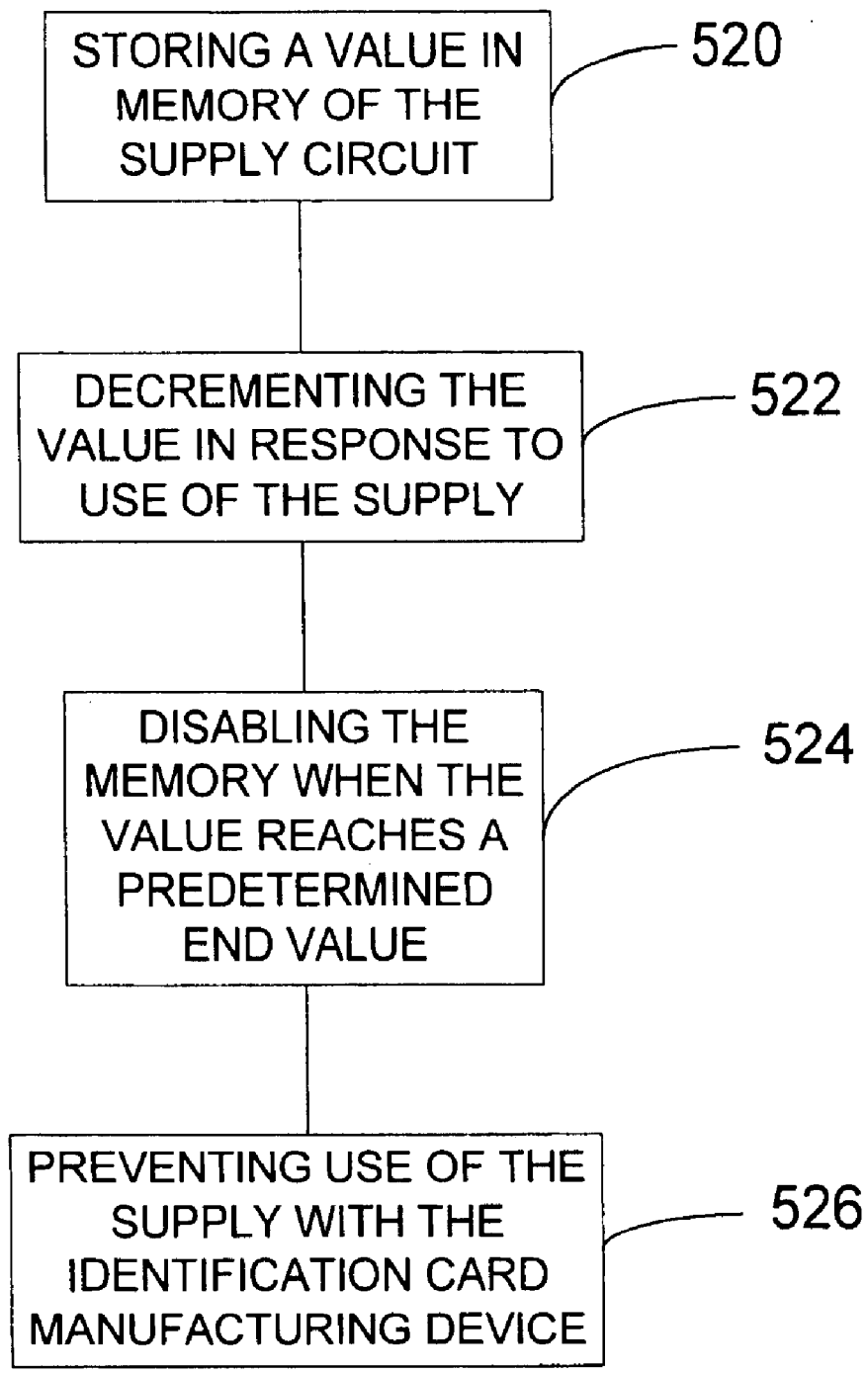
FIG. 20 is a flowchart illustrating a method of operating an identification card manufacturing device with a ribbon supply in accordance with various embodiments of the invention.

Another embodiment of the invention is directed to a method of operating printer 100, which is illustrated in the flowchart of FIG. 20. At step 520 of the method, a value is stored in memory 502 of supply circuit 500. Preferably, the value is representative of a number of prints remaining or that can be printed by print ribbon 120. Accordingly, the value can correspond to a length of print ribbon 120 that remains and is still useful for printing, for example. Next, at step 522, the value contained in memory 502 is decremented in response to use of print ribbon 120 with printer 100. Thus, as print ribbon 120 is used to print images on cards 110, the value is decremented accordingly to represent the depletion of the usable print ribbon 120 such that the value continues to represent the amount of usable print ribbon 120 that remains. This decrementing of the value is typically performed by controller 140 through supply circuit reader 510. Memory 502 is preferably disabled when the value reaches a predetermined end value, as indicated at step 524. Typically, the end value would be set such that it is likely that the print ribbon 120 is no longer usable by printer 100. The disablement of memory 502 can be performed by controller 140 and prevents further writing to memory 502. Finally, at step 526, controller 140 prevents use of print ribbon 120 with printer 100 when it is determined that memory 502 has been disabled. Preferably, a check is made by controller 140 to determine whether memory 502 has been disabled prior to processing a card 110 with printer 100. In this manner, ribbon cartridge 130 is given a limited life span over which it can be used with printer 100.

In accordance with one embodiment of the above-described method, memory 502 of supply circuit 500 is divided into a plurality of memory banks. Each bank is provided with a value representing a portion of the prints remaining in ribbon 120. During use of print ribbon 120, the value stored in the banks are selectively decremented to represent the use of the print ribbon 120 as the value in each bank reaches a predetermined end value, controller 140 disables the bank of memory 502 rendering the bank unusable. Once the values in all of the banks of memory 502 reach the predetermined end value, the controller 140 can prevent further use of the print ribbon 120 with printer 100.

Although the present invention has been described with reference to preferred embodiments, workers skilled in the art will recognize that changes may be made in form and detail without departing from the spirit and scope of the invention.

What is claimed is:

1. A ribbon cartridge for use in a card printer comprising:
    a cartridge housing including a supply spool enclosure, a take-up spool enclosure, a pair of ribbon guides, and a gap between the ribbon guides and between the supply and take-up spool enclosures;
    a supply spool contained in the supply spool enclosure;
    a take-up spool contained in the take-up spool enclosure;
    a supply of ribbon that extends from the supply spool, over the ribbon guides and the gap, and to the take-up spool; and
    a supply circuit having a memory containing supply information relating to the ribbon cartridge, the supply information including a security code.

2. The ribbon cartridge of claim 1, wherein the gap is defined by interior side walls of the spool and take-up enclosures, wherein the ribbon guides are formed by exposed top surfaces of the interior side walls.

3. The ribbon cartridge of claim 1, wherein the ribbon guides are positioned above and between the supply and take-up spools.

4. The ribbon cartridge of claim 1, wherein the gap is defined by interior side walls of the spool and take-up enclosures and is accessible from bottom and rear sides of the housing.

5. The ribbon cartridge of claim 4, wherein the gap is further defined by a plate joining the interior side walls of the supply and take-up spool enclosures.

6. The ribbon cartridge of claim 1, wherein the gap has a width at the ribbon guides of approximately 0.75 inches.

7. The ribbon cartridge of claim 1 including a card cleaner roller rotatably supported by the housing adjacent a top surface of the housing.

8. The ribbon cartridge of claim 7, wherein the card cleaner roller is supported at a rear end adjacent a rear wall of the housing and at a front end adjacent a front wall of the housing.

9. The ribbon cartridge of claim 7, wherein the card cleaner roller includes a debris-collecting exterior surface.

10. The ribbon cartridge of claim 7, wherein the card cleaner roller is removable.

11. The ribbon cartridge of claim 1, wherein the supply and take-up spool enclosures each include a rear opening for receiving a core of each of the supply and take-up spools, respectively.

12. The ribbon cartridge of claim 1, including a rotation inhibitor engaging one of the supply spool and the take-up spool and providing resistance to rotation thereof.

13. The ribbon cartridge of claim 12, wherein the rotation inhibitor includes a tab member extending from the housing.

14. The ribbon cartridge of claim 1 including a rotation inhibitor engaging the take-up spool and providing resistance to rotation of the take-up spool.

15. The ribbon cartridge of claim 14, wherein the rotation inhibitor includes a tab member extending from the housing.

16. The ribbon cartridge of claim 1, wherein the supply spool enclosure includes an opening through which the ribbon extends.

17. The ribbon cartridge of claim 1, wherein the take-up spool enclosure includes an opening through which the ribbon extends.

18. The ribbon cartridge of claim 17, wherein the housing includes a finger hold.

19. The ribbon cartridge of claim 1, wherein the supply and take-up spool enclosures have different exterior shapes.

20. The ribbon cartridge of claim 1, wherein the supply circuit is mounted to the cartridge housing.

21. The ribbon cartridge of claim 1, wherein the supply circuit is mounted to the supply spool or the take-up spool.

22. The ribbon cartridge of claim 1, wherein the supply information includes a number of prints remaining.

23. The ribbon cartridge of claim 1, wherein the memory of the supply circuit includes a memory bank, the memory bank having a limit as to a number of times data can be written thereto.

24. The ribbon cartridge of claim 1, wherein:
one of the supply and take-up spools includes a core and a ribbon guide that extends substantially perpendicularly from the core; and
the supply circuit is mounted to the ribbon guide and includes an opening through which the core extends.

25. The ribbon cartridge of claim 1, wherein the supply circuit is configured to break upon removal from the ribbon cartridge.

26. A ribbon cartridge for use in a card printer comprising:
a cartridge housing including front and rear walls, a supply spool enclosure, a take-up spool enclosure, and a cover extending over an opening of one of the spool enclosures; and
a cleaner roller rotatably supported between the front and rear walls above the cover.

27. The ribbon cartridge of claim 26, wherein the cleaner roller includes a debris-collecting surface.

28. The ribbon cartridge of claim 26, wherein the cleaner roller is mounted adjacent a top side of the housing.

29. The ribbon cartridge of claim 26, wherein the cleaner roller includes front and rear ends that are each received in an aperture of the respective front and rear wall of the housing.

30. The ribbon cartridge of claim 29, wherein the apertures are shaped to allow the cleaner roller to move between a receiving position and a cleaning position.

31. The ribbon cartridge of claim 26, wherein:
the supply and take-up spool enclosures each have an interior side wall separated from each other by a gap, and a plate connecting the interior side walls;
a supply spool contained in the supply spool enclosure;
a take-up spool contained in the take-up spool enclosure; and
print ribbon having a first end wound on supply spool, a second end wound on the take-up spool, and a middle portion extending between the supply and take-up spools and over the interior side walls.

32. The ribbon cartridge of claim 31, wherein the interior side walls include ribbon guide members positioned above and between the supply and take-up spools, the print ribbon supported on the ribbon guide members.

33. The ribbon cartridge of claim 31 including a rotation inhibitor engaging the supply or take-up spool, the rotation inhibitor providing resistance to rotation of the spool.

34. The ribbon cartridge of claim 33, wherein the rotation inhibitor includes a tab member extending from the housing.

35. The ribbon cartridge of claim 26, wherein:
one of the supply and take-up spool enclosures includes the front and rear walls, an interior side wall, a bottom, and an exterior side wall, the front and rear walls each including an opening; and
a spool including a core having a front portion extending through the opening in the front wall and a rear portion extending through the opening in the rear wall.

36. The ribbon cartridge of claim 35, wherein one of the supply and take-up spool enclosures includes a core support wall extending from the bottom of the spool enclosure, the core support wall positioned between the front and rear walls.

37. The ribbon cartridge of claim 35 including a rotation inhibitor engaging the core of the spool, the rotation inhibitor providing resistance to rotation of the spool.

38. The ribbon cartridge of claim 37, wherein the rotation inhibitor includes a tab member extending from the spool enclosure.

39. The ribbon cartridge of claim 26, wherein the housing includes a finger grab.

40. A ribbon cartridge for use in a card printer comprising:
a housing including a spool enclosure having an interior side wall, a bottom, an exterior side wall, front and rear walls each including an opening, and a core support wall extending from the bottom and positioned between the front and rear walls; and
a spool including a core having a front portion extending through the opening in the front wall of the spool enclosure and a rear portion extending through the opening in the rear wall.

41. The ribbon cartridge of claim 40 including a rotation inhibitor engaging the core of the spool, the rotation inhibitor providing resistance to rotation of the spool.

42. The ribbon cartridge of claim 41, wherein the rotation inhibitor includes a tab member extending from the spool enclosure.

43. The ribbon cartridge of claim 40 including a cleaner roller rotatably supported between the front and rear walls.

44. The ribbon cartridge of claim 43, wherein the cleaner roller includes a debris-collecting surface.

45. The ribbon cartridge of claim 43, wherein the cleaner roller is mounted adjacent a top side of the housing.

46. The ribbon cartridge of claim 43, wherein the cleaner roller includes front and rear ends that are each received in an aperture of the respective front and rear wall of the housing.

47. The ribbon cartridge of claim 46, wherein the apertures are shaped to allow the cleaner roller to move between a receiving position and a cleaning position.

48. The ribbon cartridge of claim 43, wherein:
the housing includes a cover extending over an opening of the spool enclosure; and
the cleaner roller is positioned above the cover.

49. The ribbon cartridge of claim 1, wherein the supply information includes a lot code.

50. The ribbon cartridge of claim 1, wherein the supply information includes a supplier code.

51. The ribbon cartridge of claim 1, wherein the supply information includes a ribbon type.

52. The ribbon cartridge of claim 1, wherein the supply information includes a printer configuration setting.

53. The ribbon cartridge of claim 1, wherein the supply information includes a number of prints completed.

54. A ribbon cartridge for use in a card printer comprising:
a cartridge housing including a supply spool enclosure, a take-up spool enclosure, a pair of ribbon guides, and a gap between the ribbon guides and between the supply and take-up spool enclosures;
a supply spool contained in the supply spool enclosure;
a take-up spool contained in the take-up spool enclosure;
a supply of ribbon that extends from the supply spool, over the ribbon guides and the gap, and to the take-up spool; and
a supply circuit having a memory containing supply information relating to the ribbon cartridge, the supply information including a number of prints remaining.

55. The ribbon cartridge of claim 54, wherein the supply information includes a supplier code.

56. The ribbon cartridge of claim 54, wherein the supply information includes a ribbon type.

57. The ribbon cartridge of claim 54, wherein the supply information includes a printer configuration setting.

58. The ribbon cartridge of claim 54, wherein the supply information includes a number of prints completed.

59. The ribbon cartridge of claim 54, wherein the supply information includes a locked code.

60. The ribbon cartridge of claim 54 including a card cleaner roller rotatably supported by the housing adjacent a top surface of the housing.

61. A ribbon cartridge for use in a card printer comprising:
a cartridge housing including a supply spool enclosure, a take-up spool enclosure, a pair of ribbon guides, and a gap between the ribbon guides and between the supply and take-up spool enclosures, wherein the gap between the ribbon guides is approximately 0.75 inches;
a supply spool contained in the supply spool enclosure;
a take-up spool contained in the take-up spool enclosure; and
a supply of ribbon that extends from the supply spool, over the ribbon guides and the gap, and to the take-up spool.

62. The ribbon cartridge of claim 61, wherein the gap is defined by interior side walls of the spool and take-up enclosures, wherein the ribbon guides are formed by exposed top surfaces of the interior side walls.

63. The ribbon cartridge of claim 61 including a card cleaner roller rotatably supported by the housing adjacent a top surface of the housing.

64. The ribbon cartridge of claim 63, wherein the card cleaner roller includes a debris-collecting exterior surface.

65. The ribbon cartridge of claim 61 including a supply circuit having a memory containing supply information relating to the ribbon cartridge.

66. The ribbon cartridge of claim 65, wherein the supply information includes a security code.

67. The ribbon cartridge of claim 65, wherein the supply information includes a number of prints remaining.

68. The ribbon cartridge of claim 65, wherein the supply information includes a lot code.

69. The ribbon cartridge of claim 65, wherein the supply information includes a supplier code.

70. The ribbon cartridge of claim 65, wherein the supply information includes a ribbon type.

71. The ribbon cartridge of claim 65, wherein the supply information includes a printer configuration setting.

72. The ribbon cartridge of claim 65, wherein the supply information includes a number of prints completed.

* * * * *

UNITED STATES PATENT AND TRADEMARK OFFICE
CERTIFICATE OF CORRECTION

| | | |
|---|---|---|
| PATENT NO. | : 7,018,117 B2 | Page 1 of 1 |
| APPLICATION NO. | : 10/647798 | |
| DATED | : March 28, 2006 | |
| INVENTOR(S) | : James M. Meier et al. | |

It is certified that error appears in the above-identified patent and that said Letters Patent is hereby corrected as shown below:

Section (75) Inventors:

Change the middle initial of the first inventor from "M." to --R--.

The correct name will should read as follows: --James R. Meier --

Signed and Sealed this

Twentieth Day of March, 2007

JON W. DUDAS
*Director of the United States Patent and Trademark Office*